United States Patent [19]

Cloud et al.

[11] Patent Number: 5,634,127
[45] Date of Patent: May 27, 1997

[54] METHODS AND APPARATUS FOR IMPLEMENTING A MESSAGE DRIVEN PROCESSOR IN A CLIENT-SERVER ENVIRONMENT

[75] Inventors: Donald M. Cloud, Jamestown; Kevin F. Kelly, East Greenwich; David P. Bonaccorsi, Warwick, all of R.I.; Mark K. Weeks, Berkley, Mass.

[73] Assignee: International Business Machines Corporation, Armonk, N.Y.

[21] Appl. No.: 350,166

[22] Filed: Nov. 30, 1994

[51] Int. Cl.⁶ .............................. G06F 13/00; G06F 9/44
[52] U.S. Cl. .................................................. 395/680
[58] Field of Search .................................. 395/700, 650

[56] References Cited

U.S. PATENT DOCUMENTS

| | | | |
|---|---|---|---|
| 4,819,159 | 4/1989 | Shipley et al. | 395/650 |
| 5,039,980 | 8/1991 | Aggers et al. | 340/506 |
| 5,249,293 | 9/1993 | Schreiber et al. | 395/650 |
| 5,325,527 | 6/1994 | Cwikowski et al. | 395/650 |
| 5,325,530 | 6/1994 | Mohrmann | 395/700 |
| 5,341,499 | 8/1994 | Doragh | 395/700 |
| 5,414,845 | 5/1995 | Behm et al. | 395/650 |

*Primary Examiner*—Kevin A. Kriess
*Attorney, Agent, or Firm*—David L. Stewart; Kenneth A. Seaman

[57] ABSTRACT

A message driven processor operates as middleware between clients and back-end hosts or servers in a large client-server system to reduce the number of concurrent sessions required to be supported by the network and to allow a common client user interface to divergent back-end systems. High level requests from a client in support of a business function are translated into workflows which may involve multiple requests to back-end servers by the message driven processor. Information resulting from workflows and information retrieved from back-end servers may be integrated into a single reply message to the requesting client.

19 Claims, 17 Drawing Sheets

METHODS AND APPARATUS FOR IMPLEMENTING A MESSAGE DRIVEN PROCESSOR IN A CLIENT-SERVER ENVIRONMENT

TECHNICAL FIELD

This invention relates to the field of information retrieval and more particularly to the integration of heterogenous computer systems into an enterprise wide message driven client-server system which simplifies network connections and facilitates business process re-engineering.

BACKGROUND OF THE INVENTION

The invention had its genesis in the banking failures of the 1980s which resulted in the merger of many financial institutions. As two institutions merged, there were substantial technical integration problems resulting from different equipment and different ADP philosophies. Retraining of users was required on the disparate systems of the merging organizations and there was a clash of corporate culture and doctrine which created a need for significant re-engineering of the business processes of the old organization(s), to the new.

Beyond the problems associated with merging organizations, there are also problems with modifying existing applications and adding new applications. The development process is too slow. The cross-discipline communication problems which exist between system developers and application end users are significant. It is therefore desirable to allow end users to add or modify processes with minimal or no involvement of ADP or systems personnel, and to do such work quickly.

Another problem which exists is that organizations seldom formally document the details of their business processes. This occurs in part because those processes change frequently and the people who know the processes are too busy performing the work to document the processes. Accordingly, it is desirable to have a mechanism for formally capturing and documenting business practices.

Reuse of software modules is also a difficult problem. Typically, these modules are created by programmers and other programmers either do not know of the work done by others or, if they have access to a library of such work, they are unable to recognize relevant modules using available indexing systems. Therefore, it is desirable to provide a mechanism for the reuse of modules in an easy and convenient manner.

FIG. 1 illustrates the problems of integrating two disparate automated data processing systems from two different banks. Bank 1 has an IBM host 101 running the MVS/XA operating system and running a DB-II database application. Bank 1 also has a second host 102 running the MVS/ESA operating system and a variety of older (legacy) banking applications. Bank 2 has a first host 111 running for example a Tandem™ operating system for general purpose processing and a second non-IBM host 112 running a non-IBM operating system and an SQL database management system.

Host 1 of Bank 1 has a network 103 running the SNA protocols at the higher levels and token ring at the lower levels. Each branch office has a multiplexer 107 which connects tellers 108 and ATM machines 109 to the network. Gateway 105 connects a second network 104 via gateway 106. Network 104 is a token ring network at the lower level protocol and SNA at the higher levels, with terminals 108 and 109 hanging off the network. Bank 2 has a network 113 using poll-select communications. Host 111 also services an X.25 network 114. Host number 2 of Bank 2 services a CSMA/CD network 116 utilizing TCP/IP protocols.

When integrating the automated data processing systems of the two banks together, one of the problems involves providing access to customer service representative 115 to all of the ADP resources at both banks. As illustrated in FIG. 1, this requires a network appearance on each of three networks 104, 113 and 116. Access by customer service representative to the fourth network, 103, occurs over gateway pairs 105, 106.

Customer service representatives (CSR) 115 may receive requests from the clients of either former bank and therefore must access systems from both banks. For example, if a customer calls in and requests account balance information, the customer service representative will need access to the host of the former bank on which that information resides. If a customer from the other former bank calls, the customer service representative would require access to the ADP resources of the other bank.

If a customer calls in with a request for a loan from the new merged bank, the request requires several transactions to satisfy such a compound or complex request. As shown in FIG. 2, first, the customer service representative would access a credit history (220) of the prospective borrower. Then, the CSR would access the account balance (230) and the credit card status (240) of the prospective borrower. Finally, the customer service representative might inquire as to the availability of bank funds (250) to fund the loan using yet another transaction.

The information required to satisfy the different kinds of information needed to satisfy a complex request might well be located on different hosts. Therefore, in the prior art, the customer service representative would be required to logon to the individual hosts, obtain the information and then manually arrange and assemble it in a manner that would permit a decision to be made on the loan request.

FIG. 3 illustrates a problem when large numbers of clients and hosts are involved. Assume that there were 10 hosts acting as servers for 1000 client work stations and that each client work station needed to access information rapidly from any of the hosts. Such an arrangement would require 10,000 sessions to be maintained over the network. Typically, this would strain the ability of the communication interfaces on the host to manage that number of sessions. Each host would be required to manage 1,000 sessions and each client would be required to manage 10 sessions as shown in FIG. 3. Therefore, it is desirable to reduce the number of sessions required to be maintained in order to service operations from a large number of clients.

In capturing information from a client for submission to a server, it is often desirable to replicate screens which the server produces. In the prior art, this is done by manually mapping out fields and screen literals on a blank format screen. This is cumbersome and often inaccurate. Accordingly, it would be desirable to have an ability to capture application screens from information provided from a back end host and utilize those screens either when capturing information from a front end client or when interacting with a back-end server.

When merging non-compatible ADP systems into a single environment, it is required to train operating personnel not only on the ADP equipment but on the business functions and procedures as well. It would desirable to minimize the training required by eliminating the need to train personnel on different types of ADP equipment.

Further, when modifying or instituting new business procedures, it would be desirable to be able to minimize or eliminate the involvement of programming personnel and have the change implemented by the business people only. From a users point of view, approaching the network as if it were a single entity even though it is composed in fact of heterogenous ADP systems would be very desirable. Isolating the end user from multiple protocols, multiple logons and session initiations, and hand shaking/security exchanges would also be desirable.

OBJECTS AND DISCLOSURE OF THE INVENTION

One advantage of the invention is to provide a client-server network which requires fewer network sessions.

Another advantage of the invention is to permit the integration of disparate computer systems with a minimum of integration effort.

Another advantage of the invention is to allow business end users to develop business applications with minimal or no intervention of programmers.

Another advantage of the invention is to facilitate business process re-engineering.

Another advantage of the invention is to allow the formal capture and documentation of business processes and practices.

Another advantage of the invention is to permit the reuse of functional software modules.

Another advantage of the invention is to allow for quick development of new or modified applications at the business level.

Another advantage of the invention is to unify the user interface across all back end and front end platforms to thereby eliminate the need for user training on different back end hosts.

Another advantage of the invention is to permit the screen capture of back end application screens to permit quick development for the capture of information required by the back end application programs and for the packaging of information to be sent to a back-end server.

Another advantage of the invention is the use of a common user interface when accessing any part of a heterogeneous system of computers.

Another advantage of the invention is the ability given the user to avoid any need for knowledge of communications protocols or session initiation protocols.

Another advantage of the invention is the connectivity of users to designated systems through a single message interface.

Another advantage of the invention is the incorporation of a workflow manager to assist in development and execution of process oriented user requests presented in the form of compound requests to user generated transactional workflows.

Another advantage of the invention is to overcome the problems found in the prior art described above.

These and other objects of the invention are achieved in accordance with the invention by providing a message driven client-server system which has a message driven processor (MDP) which translates a request message from a client process into a transactional workflow of one or more transactions required to satisfy the request. The transactions may result in a transaction request message or set of messages which provide the necessary information required by a server process to service the request.

Protocol independence between the back-end host and the message driven processor is achieved by server agents. The server process responds by providing reply information to the message driven processor where it is assembled, with optional other reply information into one or more reply messages which is sent to the client. Message based connectivity between one or more client processes and said message driven processor is made protocol transparent to the user by providing client agents which handle differences in network protocol.

Each type of request message which may be sent by a client is associated with a request profile which specifies the transactions necessary to satisfy the request. Similarly, each type of request message is associated with a reply profile which specifies how to deliver reply information. A client profile is also maintained for each client.

The message driven processor maintains a session control block for each session with a client. The session control block provides storage needed for memory and data management for the entire work flow. The session control block is composed of several item areas, maintained in temporary storage, that pertain to specific messaging objectives within the system. A session static area is defined for each session with a client and is established during logon to a message driven processor (MDP). A message control block is established for each request message received from the client. More than one message control block may be active concurrently. A message control block comprises a workflow static area and one or more workflow dynamic areas. Data dictionary maintenance provides data definition capabilities over the user definable item areas of the session control block. All user definable item areas are variable length.

Messages from a client can be directed to a store and forward queue which receives a request from a client, schedules processing of the request for a later time, and forwards the queued request from the client to the message driven processor for execution when the scheduled time arrives.

The invention also relates to a method of reducing the number of communications sessions required in a client server system in which a plurality of client processes running on one or more client processors retrieves information from one or more host processors by sending a request message from a client process to a message driven processor without establishing an ongoing communication session. Transaction requests from the message driven processor which require server action to satisfy the request of the request message are sent to one or more host processors; and information received back from said one or more host processors is assembled into one or more reply messages to be sent to the requesting client process. Thus, communication sessions are not required between each client processor and each host.

The invention is also directed to a method of communicating information between one or more client processes running on respective client processors and one or more server processes running on one or more host processors by way of message driven processor which translates request messages from a client process into one or more transactions one or more of which may be sent to a server process which involves sending a request message from the client process to the message driven processor, the request message containing a Message Header identifying source and destination of the message, a Message Specific Header identifying a particular type of business level request and a Message Context Area portion containing data related to the request and receiving from the message driven processor one or more reply messages containing information requested.

In apparatus for communicating information between one or more client processes running on respective client processors and one or more server processes running on one or more host processors by way of message driven processor which translates a request message from a client process into one or more transactions at least one or more of which may be sent to a server process, the inventions relates to a method of testing executable workflow objects by simulating inputs required for the workflow object and applying them to the input of the object, simulating an object receiving an output from the workflow object and testing execution flow of the workflow object by monitoring specified variables during program execution and by selectively stepping through work flow object execution one access point at a time and by setting predetermined entry points at certain points during workflow object execution to permit detailed analysis of the state of the workflow at specified points during workflow object execution.

The invention also relates to apparatus for communicating information between one or more client processes and one or more server processes by way of a message driven processor which translates a request message from a client process into plural transactions at least two of which are sent to a server process, by dispatching transactions which do not depend on the results of each other from the message driven processor, substantially concurrently, to the one or more host or server processors and then assembling replies received from the host or server processors into one or more reply messages to be sent to a client process which sent said request message.

The invention also relates to a method for communicating information between one or more client processes running on respective client processors and one or more server processes running on one or more host processors by sending a request message from a client process to an intermediate process, establishing a session control block at the intermediate process, accessing a request profile characteristic of the particular message sent to the intermediate process to identify transactions required to satisfy the request of said message, establishing one or more control blocks as part of the message control block for transactions, selecting transactions for dispatch to one or more server processes, dispatching, concurrently, those transactions which do not depend upon completion of earlier dispatched transactions by retrieving a request view of data contained in the session control block and packaging that data into a workflow request, establishing or accessing a previously established communications session to a host running the server process required to satisfy the transaction and sending the workflow request to the host, receiving a response from a replying host or server, mapping data received from that host or server into a reply view of data, storing the reply view of data in the session control block; and assembling one or more reply messages from data stored in the session control block and sending the reply message(s) to the requesting client process.

The invention also relates to a method of constructing screens for packaging information to be sent to a server process for retrieving information or to a client process for obtaining information from the client to be sent to a server process by storing a map of screen information received from a server process, associating specific areas on the screen with variable information to be sent to or received from the server; and saving said bit map with representations of variable information for transmission to said server process.

The invention also relates to a hierarchical message driven client-server system which has a plurality of sets of client processes running on respective client processors, one or more server processes running on at least two host processors, a first level message driven processor for translating a request message from a client process into one or more first level transaction messages required to satisfy the request, one or more second level message driven processors for translating a request message from a client or a transaction message from a first level message driven processor into one or more second level transactions required to satisfy the request, client agents for providing message based connectivity between a client process and said first level message driven processor, server agents for providing connectivity between the first and second level message driven processors and the server processes; and apparatus for assembling reply information from a second or higher level server process into one or more reply messages and sending the reply message to the client process which sent the request message. As a result, a request message from a client processor is translated into transactions and transactions are selectively sent to one or more host processors in a hierarchy of host processors and information retrieved is returned to the client in satisfaction of the request message.

The invention also relates to apparatus for communicating information between one or more client processes running on respective client processors and one or more server processes running on one or more host processors by way of message driven processor which translates a request message from a client process into one or more transactions, comprising one or more workflow objects, at least one or more of which transactions are sent to a server process, a method of generating executable workflow objects by interrogating a user as to information needed to define a workflow object, incorporating that information into a skeleton of source code, so that the combined information and skeleton constitutes a complete source code list, compiling the source code list into executable code, and storing the executable code as a workflow object which can be selectively incorporated in workflows to satisfy a request from a client.

Still other objects and advantages of the present invention will become readily apparent to those skilled in this art from the following detailed description wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature and not as restrictive.

BEST MODE FOR CARRYING OUT THE INVENTION

Figure 4:
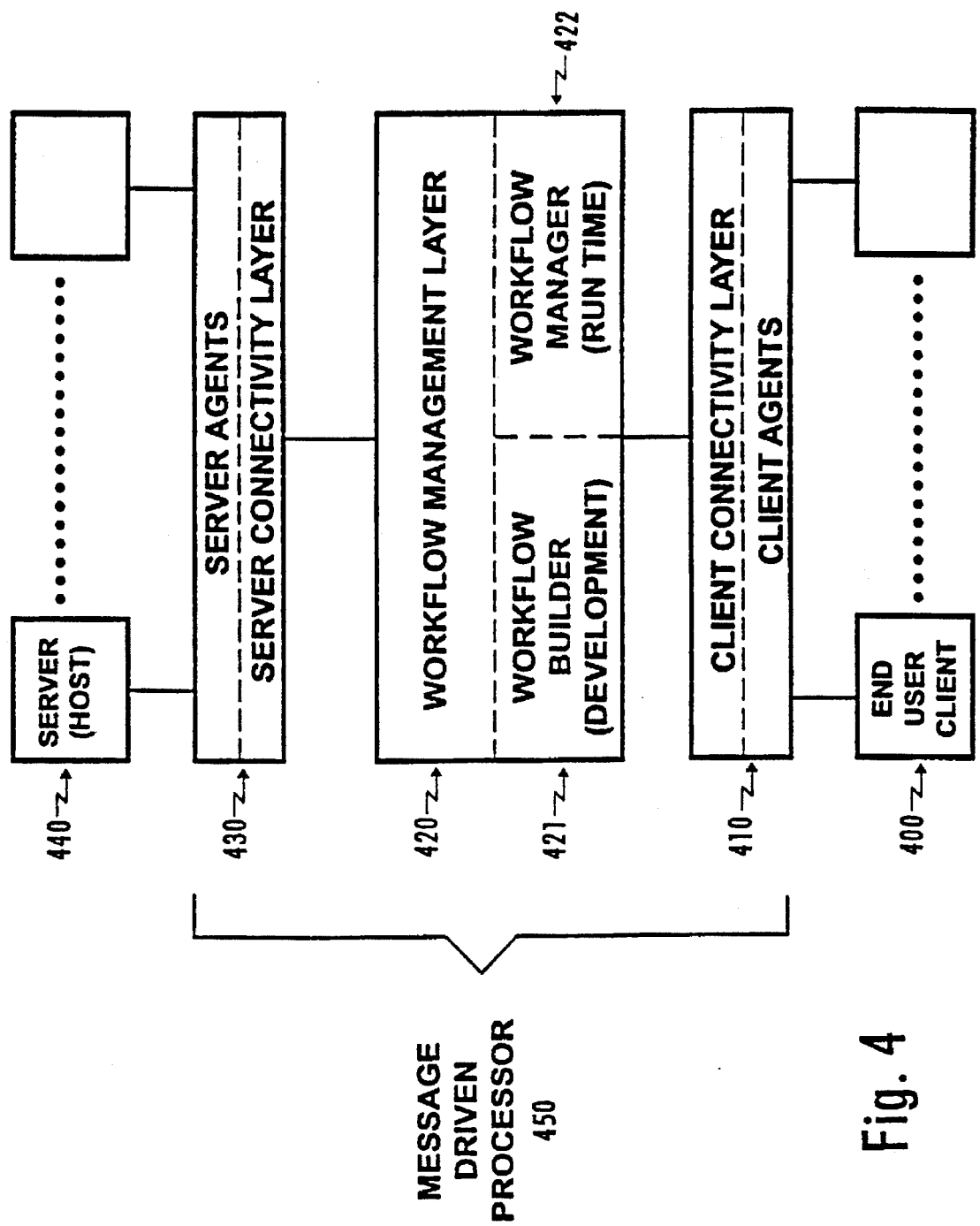
FIG. 4 is an overview of the message driven architecture of the invention.

FIG. 4 shows the invention at a high level. A number of end user clients 400 are connected to a client connectivity layer 410. Similarly, a number of servers 440 are connected to a server connectivity layer 430. A work flow management layer 420 mediates between the client connectivity layer and the server connectivity layer performing the work flow management functions.

This architecture permits the user, with no knowledge of data location, to approach the entire network as if it were a single entity.

The invention provides any to any (or many to many) connectivity using application to application communications and a work flow processing environment between front end requests for service, by clients, and back end applications running on hosts or servers.

A client connectivity layer 410 insulates the business process from device specific protocols. A work flow management layer 420 including development section 421 and run time section 422, decomposes a complex request into several individual transactions and recomposes the results of those transactions into one or more replies. A server connectivity layer 430 works in conjunction with the work flow management layer to permit connectivity to back end applications which have been inherited from the merging organizations (legacy applications) as well as newly engineered back end systems for which common application programming interfaces are available.

The client connectivity layer allows multiple, disparate clients to request the same services, regardless of front end protocols and device types. Clients interact with client agent interface programs, which filter out device-specific protocols and allow business requests, in the form of messages, to be passed on to the workflow management layer.

The client connectivity layer behaves as a connectionless environment to fully accommodate synchronous and asynchronous client/server requirements. The client connectivity layer accomplishes the following functional objectives.

Supports device-specific protocols to a variety of industry-standard device types to perform the application-to-application communications necessary to send a request and receive a reply.

Provides create, continue and reattach capabilities for a logical session.

Establishes a session control block, an internal application program interface memory management area used by the workflow manager during execution of the request's workflow, and for overall memory management processing.

Terminates and archives a logical session and, upon signoff, deletes the session control block.

The client connectivity layer is composed of three basic modules: client agent, input request manager and output reply manager A client agent is a device driven program responsible for communications and protocol in relation to the sending and receiving of requests and replies, and communication error recovery. This program also allows for custom user exit points for use in such things as journaling. Client agents receive request messages from the client and direct them to the input request manager, and receive reply messages from the output reply manager and send them to the client.

The input request manager is the primary entry point of request messages into the MDP. Apart from performing session establishment, security checking and client validation and registration functions, the input request manager can also be a custom-coded entry point into the workflow manager. This means that the input request manager can translate disparate front end message protocols into MDP message formats, allowing clients with existing application message formats to be accepted by the workflow Manger. In this manner, the integrity of the application program interface is preserved.

The input request manager performs the following functions.

Receives or retrieves request messages, depending on task initiation.

Validates security and registers clients.

Processes session reattach functions.

Creates the session control block and completes associated memory management tasks.

Manages allocation of multiple message control block areas when required for concurrent processing of requests.

Processes and journals session errors.

Accesses the reply profile to stage the output reply parameters when a reply is to be sent from the workflow Manager.

Journals request messages.

Processes application program interface extension user exit points, allowing application level protocol translation and message reformatting.

Accesses the request profile to determine special attributes associated with the request, and validates the request's request profile against the request profile file.

The output reply manager supports the reply side of message processing. The output reply manager is initiated by the workflow manager when the unit of work is complete. The output reply manager then formats the reply message from the session control block. Next, the output reply manager uses the reply profile parameters, loaded previously in memory, to determine the proper reply process, and sends the completed message back to the client, via client agent module, if applicable. The output reply manager is also designed openly, allowing customization to be implemented where necessary.

The output reply manager performs the following functions:

Uses the reply profile parameters, loaded into memory previously by the input request manager, to determine how the reply should be sent to the client.

May initiate client agent module.

Maintains/updates session file record upon completion of the request.

Maintains the session control block for subsequent request message processing, or deletes the session control block upon signoff.

Manages deallocation of message control block areas upon completion of concurrent requests.

The workflow Management layer is made up of two environments that control the enablement, generation, and processing of messages in the form of workflows. workflows, which contain executable workflow objects that together fulfill the requirements of a request, are created in the development environment, and then executed in the run time environment. The major system component of the development environment is the workflow object builder. The major system component of the run time environment is the workflow Manager.

At run time, the workflow Manager is initiated by a request message which it receives as input. Since the workflow Manager is not responsible for the initial receipt of the Request (nor its resulting replies), it is not encumbered by network dependencies that would limit the reusability of a workflow. The processing which begins with a request and ends with one or more replies is done within the workflow.

A workflow can represent a very simple or a very complex function. Typically, the more complex the function, the more units of work there will be in the workflow. To complete a complex workflow, the workflow will decompose the message received and invoke a synchronous unit of work and, perhaps, one or more asynchronous units of work, to independently retrieve information from different sources as necessary and process it. Asynchronous units of work may execute waited or nowaired. Based on design of the unit of work, the workflow recomposes the resultant information in the session control block memory management area into a reply, which is then sent back to the client. Between the workflow Manager and the workflow, the complexity of the business function is removed from the client. This concept of complex transaction enablement lets the client make simple single requests for services, and receive simple single replies or a series of replies, in return.

To gather information from the required sources, a workflow may provide connectivity between the workflow Manager and multiple disparate back end systems. This contributes to the single system image viewed by the client. In this respect, the workflow becomes a network server component that any client in the enterprise can access just by issuing a simple request. (Also eliminated is the need for multiple logons). Since Request design is based solely on actual business functions or processes, any client in the enterprise can issue the same request and access the same business function, promoting a great deal of reusability, convenience and consistency.

At the center of MDP is workflow Management. The development and execution of workflows to satisfy the requirements of request messages, fast path business request messages and the signon and signoff request messages is the nucleus around which the enterprise can build an effective, efficient, and consistent processing environment.

A workflow may be organized into one or more units of work; each unit of work performs a part of the overall business request. A workflow contains one synchronous unit of work and optionally one or more units of work that may be dispatched to execute substantially concurrently. The smallest unit of work that is capable of executing by itself is a workflow object. A workflow typically consists of multiple workflow objects.

Session Control Profiles link initiation of the execution of the workflow to reception of a Session Request Message.

The MDP receives a request message which contains a request profile ID, which in turn points to the first workflow object or profile in the workflow. Using data in the request message, workflow execution then begins.

The MDP may receive a standard or extended signon request message or a signoff request message, which may indicate the first workflow object or object profile. Using data in the standard or extended signon request message or signoff request message, workflow execution then begins.

MDP also supports the fast path business request message, a method to conserve memory by supporting the logical session for only those clients whose workflows are currently in progress and a method of supporting MDP to MDP communication.

The workflow may execute using data from one or more sources:

Data from the request message,

Data created during workflow execution,

Data retrieved from user-defined files via user exits,

Using ancillary products, data acquired from other back end hosts or applications.

Depending on design and on the outcome of the workflow, the workflow may result in one or more of these Disposition actions:

Reply message to the client,

Storage of the request on the store and forward queue for scheduled execution later, Storage of this workflow's data on another queue, for processing by another workflow or by a special purpose system request message, Stoppage of processing with no further action.

During a logical session, MDP may receive a subsequent message that points to a new workflow. Further, MDP supports execution of multiple concurrent workflows, initiated by multiple messages from the same client.

The workflow Management development environment provides menu-driven workflow building tools that allow the developer to:

Define and generate data definitions of all input, output and intermediate storage areas and message formats.

Define and generate workflow objects of different types to interact either synchronously or asynchronously with the workflow Manager and back end systems.

Simulate the execution of, and debug, workflows.

Define parameter information necessary for interaction with Server Agent.

Access utilities that support the development process for generating, compiling and copying workflow object definitions.

The work flow management layer is made up of two principal environments that control the enablement, generation and processing of messages in the form of work flows. They are created in the work flow development environment 421 and then executed in the work flow manager run time environment 422. Work flows contain executable objects that together fulfill the requirements of a request.

The Major components of workflow development include the workflow object Builder which is a tool that is used to define and generate complex units of work in the form of a workflow. The component allows the developer to define the attributes of each workflow object associated with the workflow. Data Dictionary Maintenance is also included in workflow development. A Data Dictionary Builder provides data definition capabilities over the user accessible item areas of the session control block. All item areas relating to user-defined message areas are variable length. This allows the developer to define the maximum space requirement for each business function, making for an efficient use of space.

At run time, the work flow manager is initiated by a request message which it receives as input. Since the work flow manager is not responsible for the initial receipt of the request (nor its ultimate reply to the requester), it is not encumbered by network dependencies which would limit the reusability of a work flow. The execution of an output reply by the work flow manager marks a completion of a work flow. The processing which begins with a request and ends with a reply is also called a unit of work. A work flow can represent a very simple or a very complex function. Typically the more complex the function, the more pieces there will be to the associated work flow.

To complete a complex unit of work, the work flow will decompose the message received and invoke several tasks to independently retrieve information from whatever different sources are necessary. Upon completion of all individual tasks, the work flow manager manages all of the information placed into the session control block, to be described hereinafter, into one or more comprehensive replies which may then be sent back to the client. Between the work flow manager and the work flow, the complexity of the function is removed from the client. This enables the client to make simple single requests for services and receive simple single replies in return.

To gather information from the required sources, a work flow may request connectivity between the work flow manager and multiple disparate back end systems. This contributes to the single system image viewed by the front end client. The work flow just becomes a network server component that any client in the enterprise can access just by issuing a simple request. This eliminates the need for multiple logons. This also allows an enterprise to add value to existing back ends while evolving newly engineered functions and presentation capabilities on the client's side. Since request message design is based solely on actual business functions or processes, any client in the enterprise can issue the same request and access the same function promoting a great deal of reusability, convenience and consistency.

Figure 5:
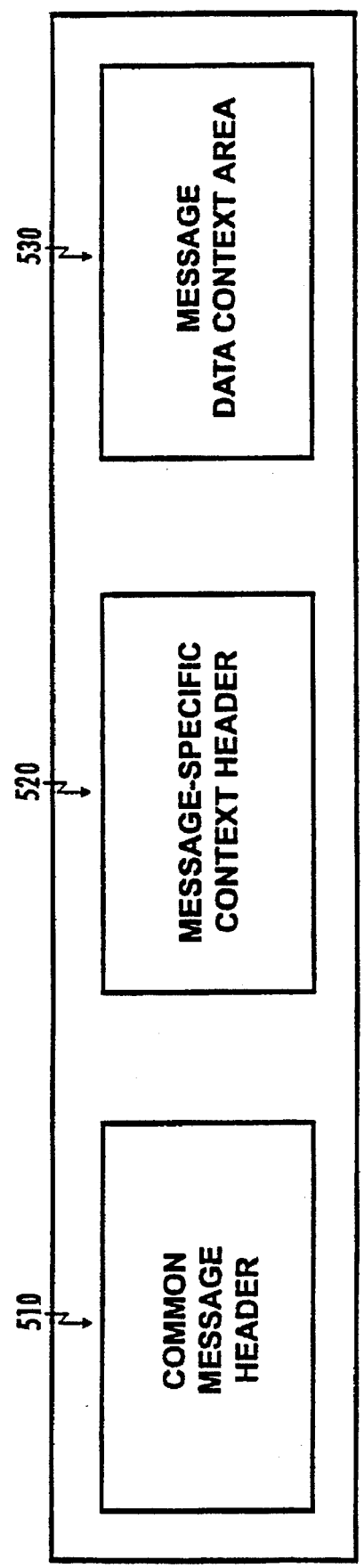
FIG. 5 is an illustration of the basic message format at the application level.

All requests from the client and all replies to the client are formatted in a basic message format illustrated in FIG. 5.

The common message header labels all message traffic to and from the Client. It uniquely identifies the requesting Client and associates the unit of work requested with that Client. The common message header is carried in all required Request and Reply Message exchanges associated with the request or the logical session.

The Message-Specific Context Header varies in content with each specific message type and defines static fields that must be populated by the requesting Client and becomes the context for each message type. The data in these fields correspond with functions performed by the various layers in the workflow Management environment.

The Message Context Area includes variable length data used to supply user-defined and formatted data to a particular Business or System Request. The developer decides the length, content and the request and reply format during the workflow Development phase. After the Request is defined, the workflow Manager will associate the Request with a workflow. The workflow is developed to accept data from the request format and, eventually, map data to the reply format of this segment after processing has been completed. The format of the data in this segment can vary with each Request and may even vary within a Request. This segment is defined by the developer based on the needs of the Request.

These three basic components provide a basis for both Request and Reply Messages. The Common Message Header and the Message-Specific Context Header are required of all messages and are fixed length segments. The Message Data Context Area is of variable length, defined by the developer, based on the needs of the system request or business function.

Figure 6:
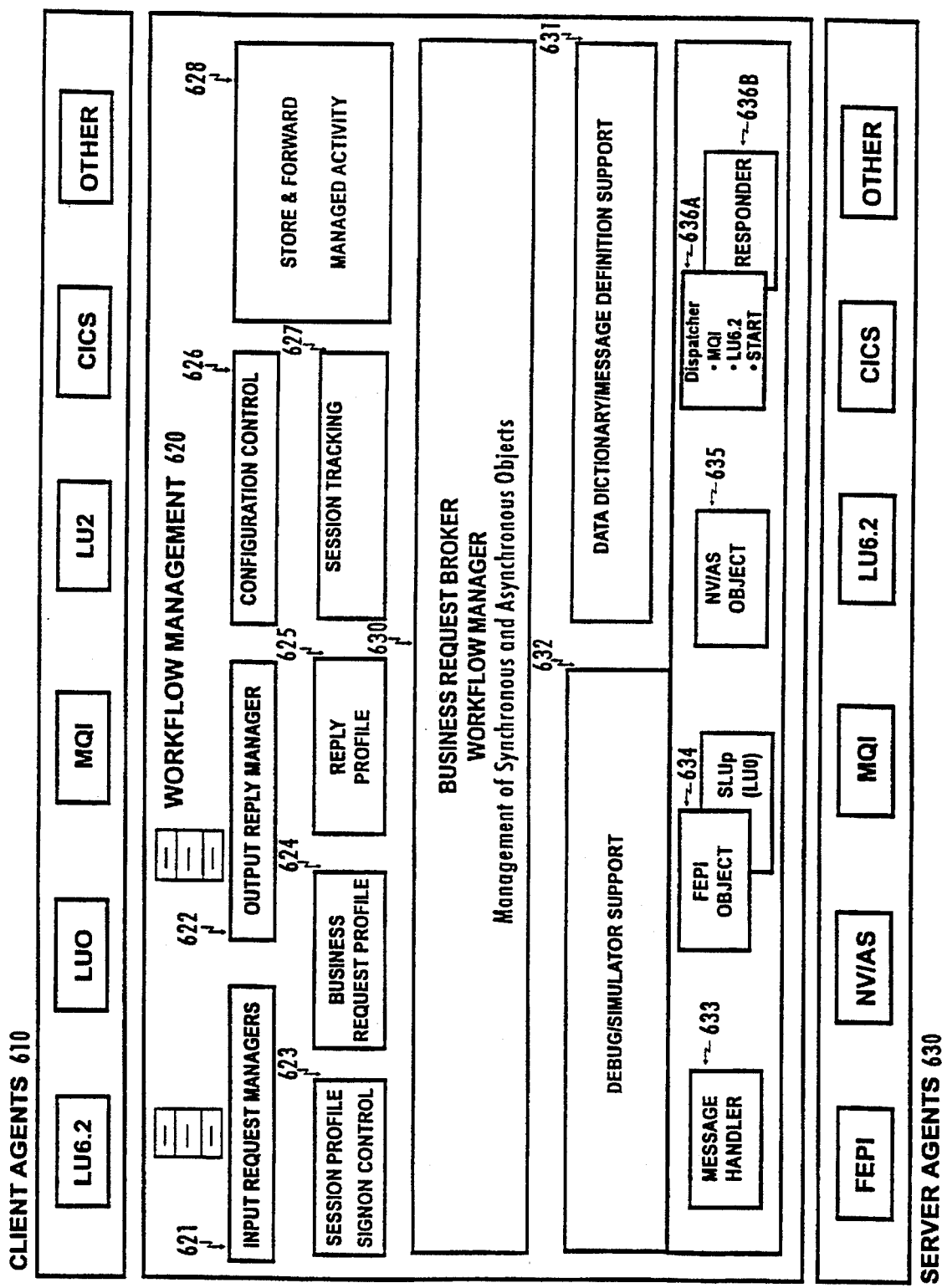
FIG. 6 is a diagram of the functional components of the message driven processing system of the invention.

FIG. 6 illustrates the message driven processor 450 in greater detail. A set of client agents, 610, act as protocol engines to insulate the work flow management layer 620 from the different protocol layers which wrap the illustrated in FIG. 5.

On the back end, server agents 630 perform a similar function. A message handler 633 formats data to be sent to back end servers and passes it to either FEPI object 634, NVAS object 635 or dispatcher-responder pair 636A and 636B where the interaction with the back end server is handled. Independence from back end server protocols is achieved by server agents 630.

Work flow management will be described more in detail hereinafter.

Figure 7:
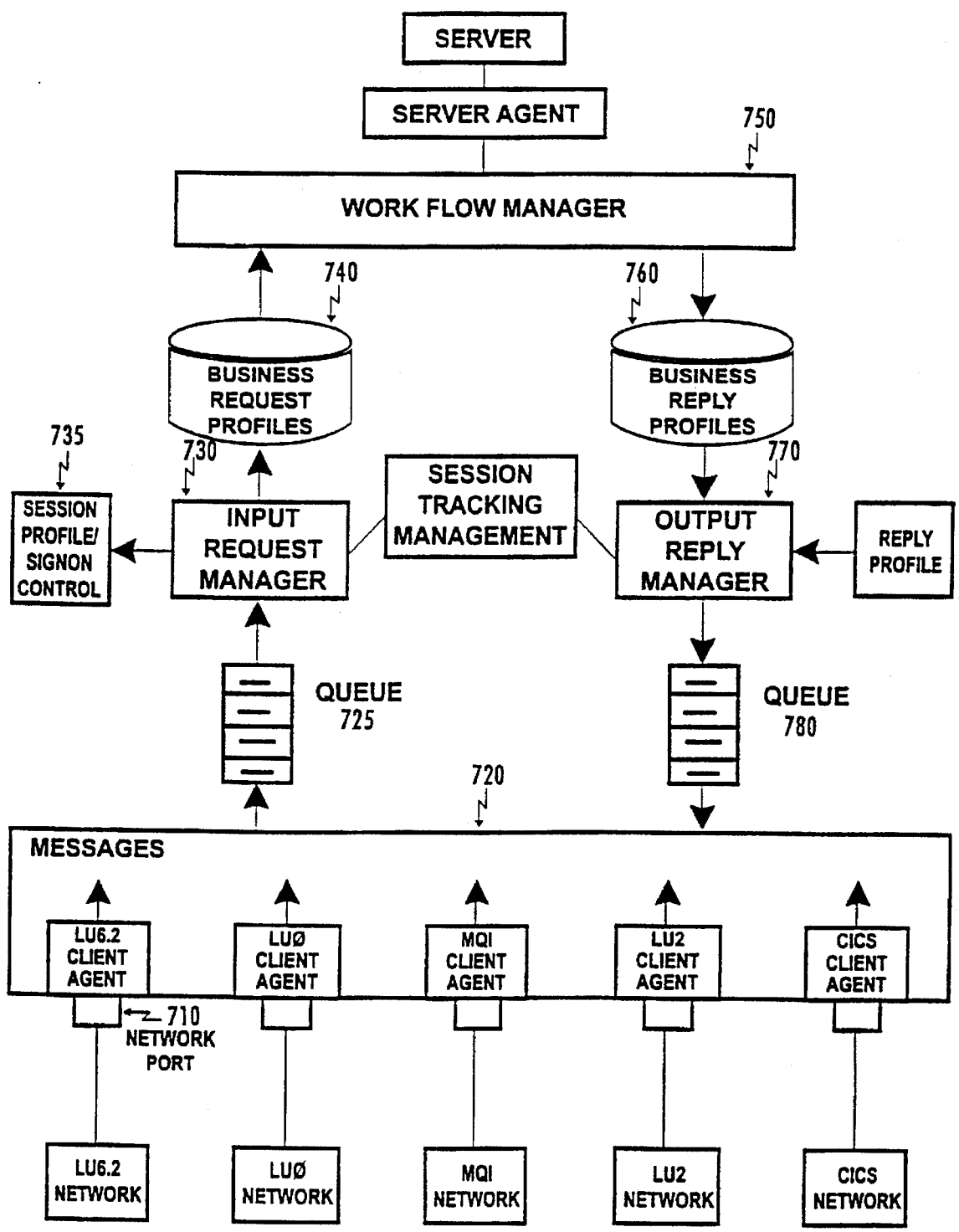
FIG. 7 is an illustration of the connectivity between client networks and back-end servers using the work flow manager of the invention.

FIG. 7 illustrates the processing of a message from a client up to the work flow manager level shown in FIG. 6. The message driven processor has a number of network ports, 710, each of which services a corresponding network. Each network is characterized by a communications protocol which specified how stations on the network interact. Protocols LU6.2, LU0 and LU2 are protocols generally utilized in an IBM environment. CICS stands for Customer Information Control System which is an IBM product permitting access to application programs associated with it, formatting information in a manner analogous to a formal protocol. MQI stands for Message Queuing Interface and represents protocols associated with the MQ™ Series software product by IBM. MQ™ Series simplifies communications by utilizing a simplified command set.

Returning to FIG. 7, each of the client agents, 720, manages communications below the application layer passing only the application level message to queue 725 for delivery, in turn, to the input request manager 730.

A client wishing to sign on to the message driven processor may do so in one of two modes. If a great deal of transaction volume is expected from that client over the course of a day, the client may wish to sign on and remain permanently signed on to the system. On the other hand, if only occasional access is required, a session may be established only for the duration of each request. Session profile/sign-on control 735 manages sign-on in accordance with the session profile which is selected based on the content of the sign-on message received from the client. Which method of sign-on is preferable depends on the amount of overhead required in establishing and tearing down session control blocks, described hereinafter.

A Client sends a sign-on request message in preparation for the day's processing. The sign-on request message may be transported from the LAN server to the host via a LU 6.2 transport. The LU 6.2 Client Agent program is initiated and any data conversions or protocol specific logic is performed at this time.

The Client Agent starts the Input Request Manager. MDP determines the file base and processing mode. The Client Profile file is read and the Session Control Request Message is validated. The Session file is read to determine if a session had already been established for that Client. The Request Profile file is then read to determine the detail parameters of the Sign-on Request, and optionally may point to a workflow or workflow object to be executed at sign-on. The Reply Profile is read to determine the reply characteristics. Since this is the first sign-on of the day, a Session record is written. Sign-on processing controls overall processing of the Client's session, controlling access to workflows and data stored on the host, based in part on the Client's assignment to an MDP Office. Once all file processing has been successfully completed, the request information is formatted and a session control block is created. The Client Profile is rewritten with a Client Session ID. The Input Request Manager then initiates the workflow Manager.

The workflow to which the sign-on request message may point as an option may support more complex processes such as logging on to the back end servers.

Alternatively, a fast path business request message may be sent at any time—without regard to whether an MDP session is established for this Client. It my be used to immediately begin processing a workflow, without previous sign-on. The Request Message and the Fast-Path Business Request Message may contain data for the workflow to process. Both the Request Message and the Fast Path Business Request Message point to a Request Profile ID. The Request Profile ID points in turn to the workflow.

Associated with each possible request submitted by a client is a request profile. These profiles are accessible in block 730 and 750 of FIG. 7. A request profile is a decomposition of the incoming business request into units of work or workflow required in order to satisfy the request.

Figure 1:
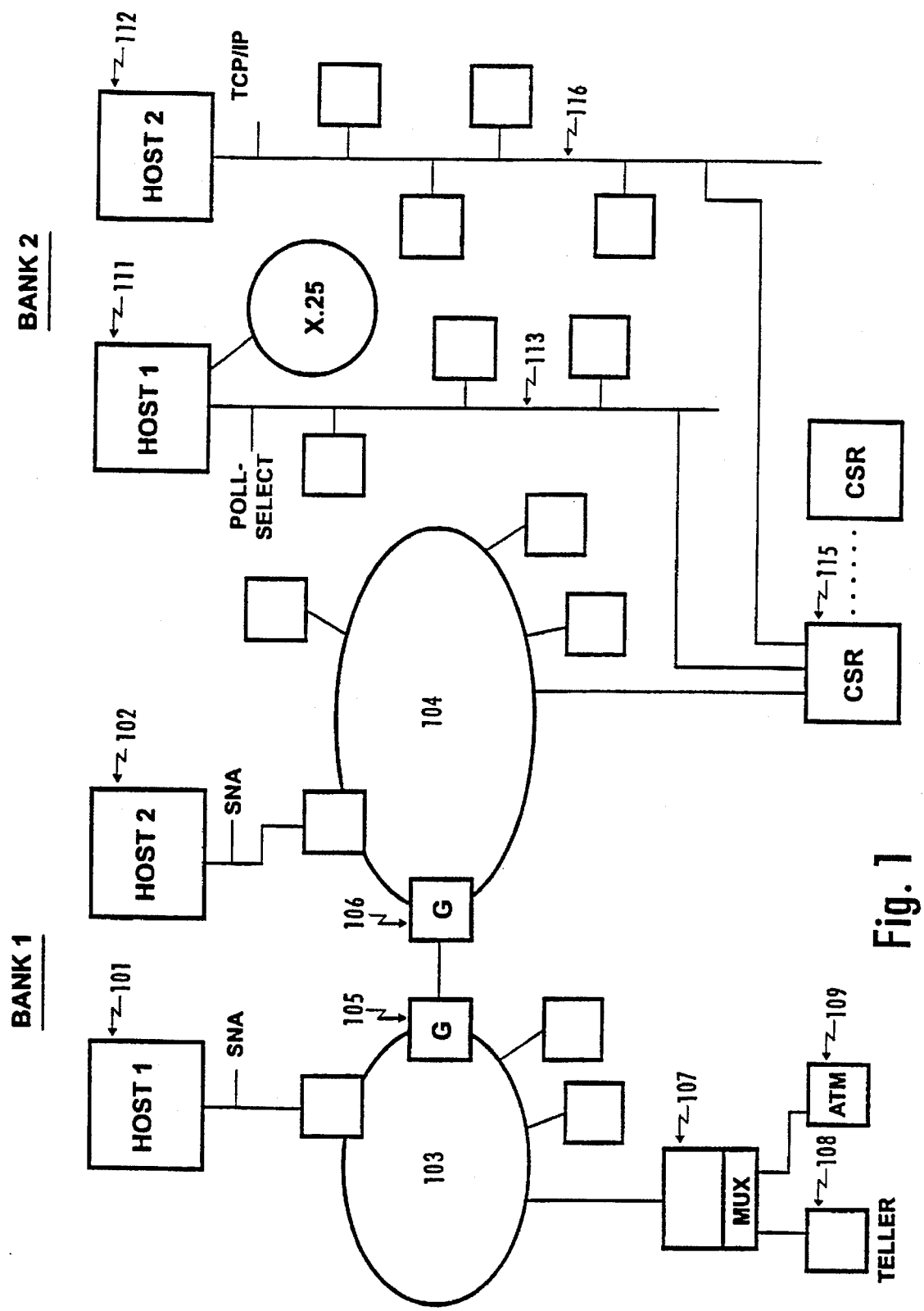
FIG. 1 is a diagram utilized to illustrate the problems associated with merger of two different organizations.
Figure 2:
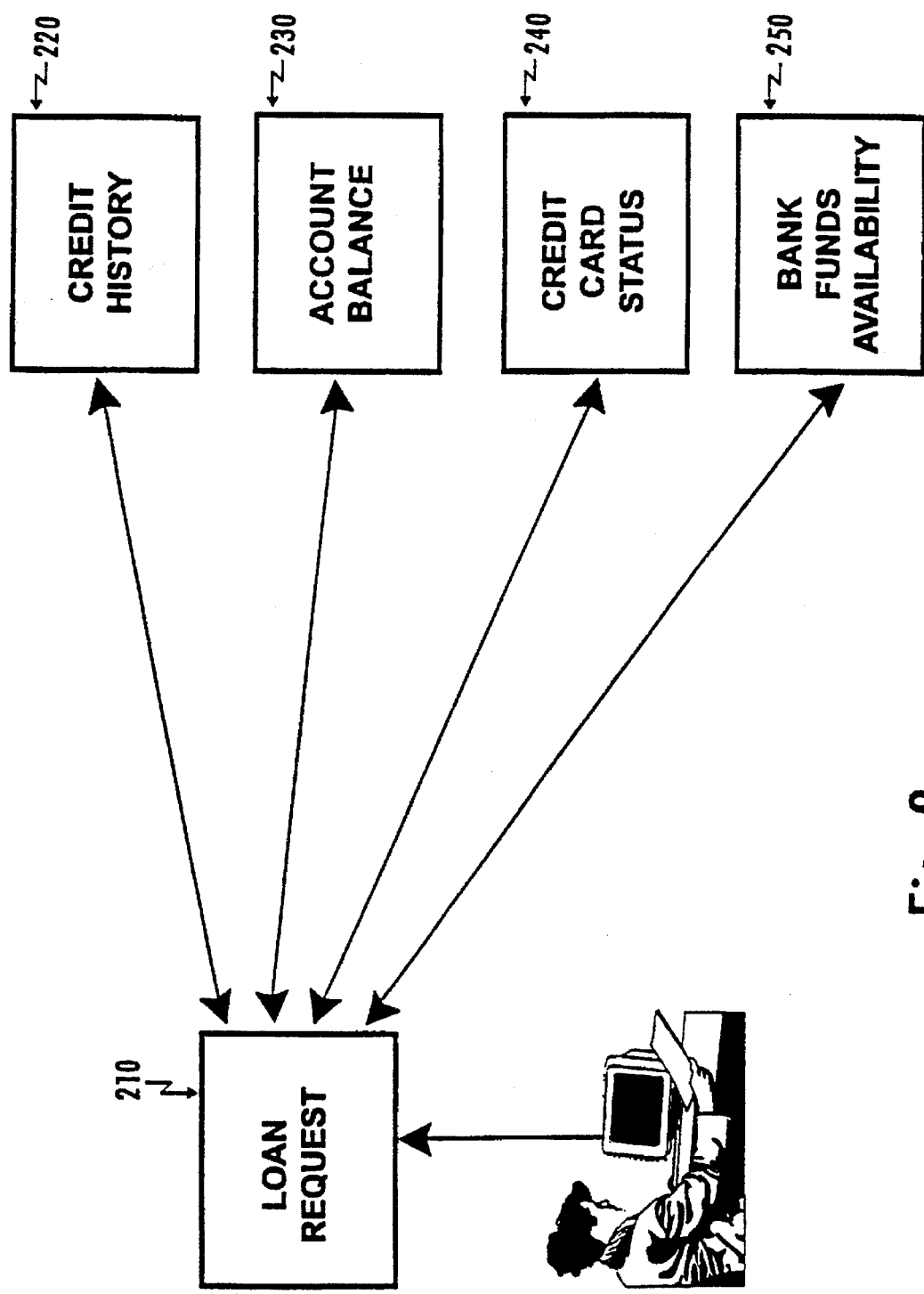
FIG. 2 is an example of how a particular business request results in multiple transactions necessary to satisfy that request.
Figure 3:
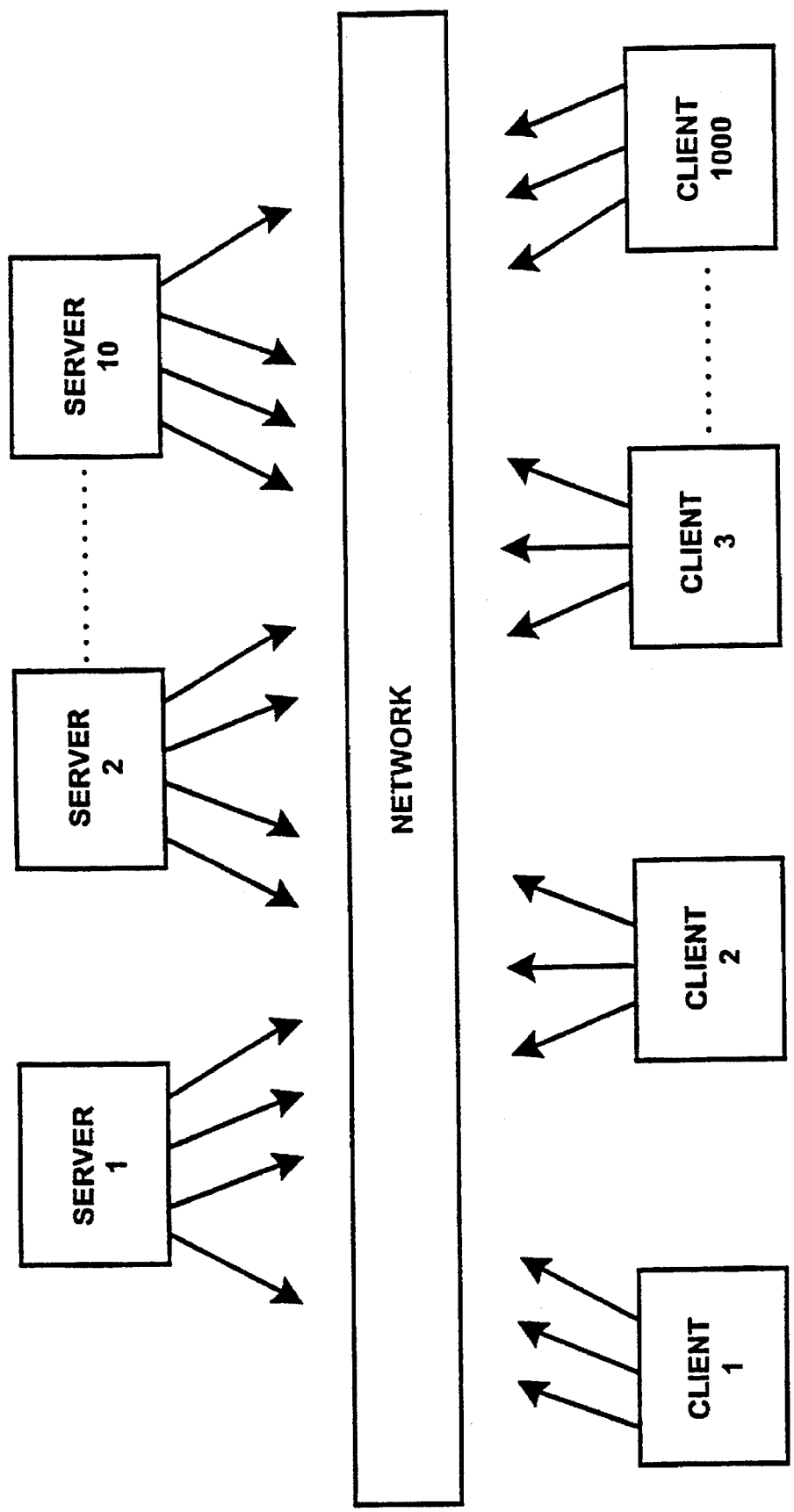
FIG. 3 is a diagram of session management in a multi-host, multi-client, client-server system.

To illustrate the use of a request profile, in the example shown in FIG. 2, according to the invention a request in the form of a message to approve a loan illustrated as step 2 would be decomposed into four different requests for information as defined by the request profile, one to retrieve a credit history, one to retrieve an account balance, one to retrieve credit card status and one to confirm bank fund availability to fund the loan. The individual requests which make up the profile of the request from the client are then processed by the work flow manager environment where they are individually packaged for sending to the back-end servers. Once all of the replies to the separate transactions have been received back, the information is assembled into one or more reply messages and sent to the output reply manager 770 where it is queued for transmission to the client using the specified client agent. The outgoing application level message is sent to the client in the protocol appropriate for the network by the client agents and sent to the client.

Work flows are essentially composed of a series of work flow objects, whether they are individual objects or a plurality of objects grouped together in object profiles, and routing parameters for processing instructions defined at the request profile level to direct the order of execution of the work flow objects. A work flow object is a generated program designed to accomplish a specific task or function, allowing its reusability by multiple work flows. Work flow objects are generated dynamically by the work flow object builder and may themselves contain internal routing parameters, which are defined within the work flow object. Although work flow objects are designed to be executed from within a work flow, they can be created work flow independent. The reusable nature of work flow objects allows them to be associated with multiple work flows, each of which may use the object in a different scenario. A work flow object processing sequence may be incorporated alone into a work flow or it may be part of an object profile which contains a processing series of work flow objects. Like work flow objects, object profiles can also be reused by multiple work flows.

Figure 8:
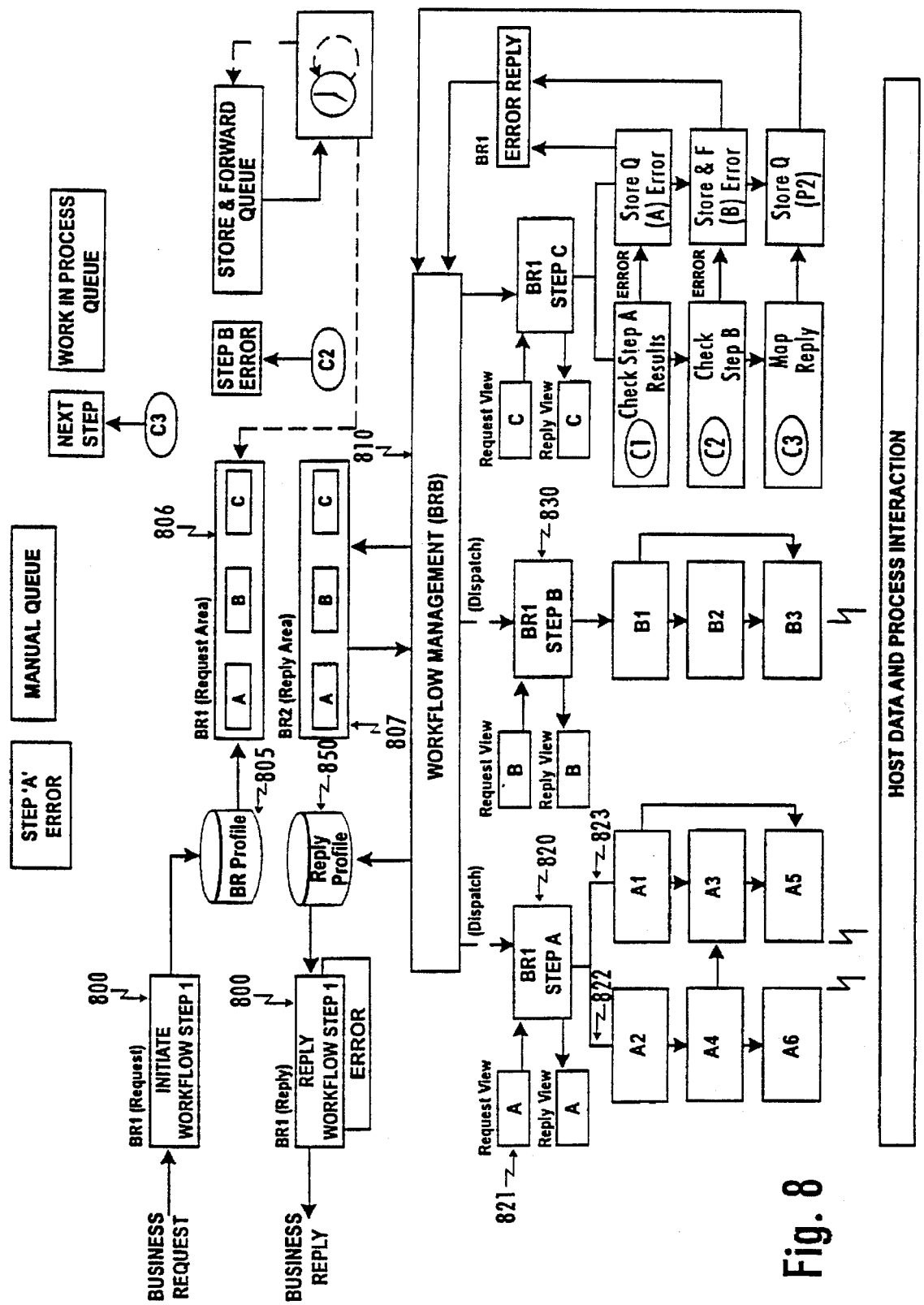
FIG. 8 is an illustration of how a request is translated into a transactional work flow for delivery to back end servers.

FIG. 8 illustrates a typical request message, its decomposition into a transactional work flow, the execution of the work flow and the composition of one or more reply messages to the client requestor and queuing steps required to complete the business flow.

A request is received at the input request manager 800 which accesses the request profile in storage 805. In this particular instance, the request requires three units of work to complete. These are labeled A, B and C in the drawing. Separate storage areas are set aside for the request and reply data. In each area, a separate storage area belongs to each of the units of work required to complete the request. The work flow manager 810 determines that units of work objects A and B can be executed concurrently and that unit of work C must await the completion of units of work A and B.

Work flow manager 810 dispatches unit of work A at step 820 and unit of work B at step 830. Step A work flow object A involves viewing the data (821) associated with the client request message to extract the data needed to formulate the transaction associated with work flow object A. Once the request view of the data is obtained, the two branches 822 and 823 of processing utilizing that data can proceed culminating in steps A5 and A6 in unit of work A which access one or more host computers to retrieve data. A similar process occurs with work flow object B as illustrated in the work flow 830 including B1 through B3 shown in the drawing. As units of work A and B are executed, the reply data is returned to storage area BR2 (807) and stored in respective blocks A and B. Step C, the final step in the work flow, takes the data from A and B, does data correction, checking and error handling, and passes reply data to area C of reply area BR2. Reply profile data 850 is utilized to determine how the data in the reply area is to be sent to the client using a client agent, if necessary. Once a reply message is sent, the storage areas dedicated to the request are freed up for use by other processes.

The data dictionary/message definition support 631 shown in FIG. 6 is used to design, generate and maintain data dictionary entries (chapters) which map storage areas to data elements and structures (principally in the session control block), for use by work flows. Data item areas, user files, temporary storage and request and reply messages are normally defined and dynamically maintained in data dictionary chapters and are used to direct data placement during work flow processing.

Figure 9:
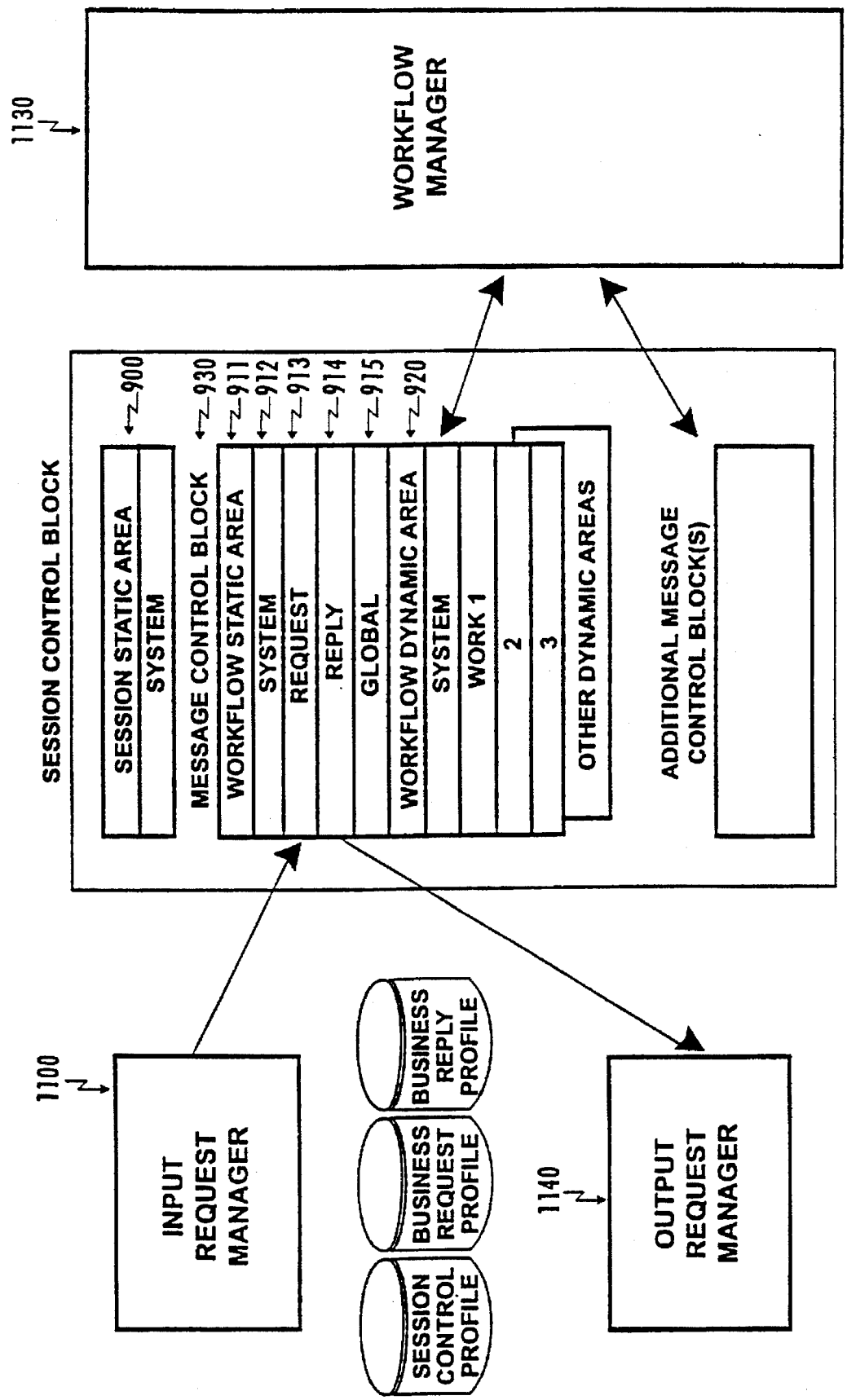
FIG. 9 is an illustration of how the session control block is utilized in the decomposition of incoming messages and the composition of reply messages.

The request and reply storage areas 806 and 807 of FIG. 8 represents a common memory area for the operation of a work flow called a session control block. The session control block provides storage needed for memory and data management for the entire work flow which comprise a plurality of message control blocks. The session control block is composed of several item areas, maintained in temporary storage, that pertain to specific messaging objectives within the system. As shown in FIG. 9, a session static area 901 is defined for each session with a client and is established during MDP logon. A message control block 930 is established for each concurrent request message received from the client. More than one message control block may be used concurrently. A message control block comprises a workflow static area and one or more workflow dynamic area 920. Data dictionary maintenance provides data definition capabilities over the user definable item areas of the session control block. All user definable item areas are variable length.

The session control block allows the MDP session to maintain a connectionless, non-blocking conversation with a front end client and to maintain the data for all work flow objects. Each message control block is primarily made up of two temporary storage areas one containing static item areas and one dynamic item areas. The workflow static area of the message control block contains a workflow static item area 911 and a workflow dynamic area 920.

The workflow static area (workflow area) has a system-reserved area containing static information that relates to one workflow. This item area cannot be modified, but may be browsed.

The request area contains the request message and reply area which may contain one or more reply messages sequentially to be sent back to the client.

FIG. 9 illustrates in more detail the operation of the session control block. When a request message is received, a message control block is created as discussed above. In the workflow static area 911, the request data received with the request message is written in block 913. Similarly, when all information has been received from the back end server, and from internal processing in the work areas of the workflow dynamic block the work flow manager 930 may assemble data into the reply message data format in the reply section 914 of the message control block. That message data is then passed to the output request manager 940 where it is sent to the client requestor.

The global area is used to store event user data throughout the length of a workflow typically used to collect data for use in multiple workflow objects and during asynchronous workflow processing.

The workflow dynamic area 920 contains 3 work areas, pre-defined in a set of data dictionary entries, and a dynamic system area containing data relating to a workflow object and its processing.

One should distinguish between the session control block created when an MDP session is established and a communication session. Typically, communication sessions are transitory, operating in the connectionless mode. That is, the client and the client agents interact only long enough to receive the message and acknowledge the message. The communication session, does not typically remain active during the processing required to obtain the request data. When the requested data has been obtained, one or more reply messages will be sent to the client requestor in the connectionless mode. The message control block, however, which defines the data request session, remains active throughout the lifetime of the processing until all reply messages are sent to the client. Thus, even though a communication session is not continuous throughout the processing, an MDP session is normally maintained until a logoff request is received from the client requestor.

As set forth herein, a client requestor may logon to the MDP for only the duration required to process a single message via fast path processing, or, where high transaction volumes are expected, for a larger duration such as all day. As used in this sense, logging on involves establishing a session control block for the client requestor. Similarly, message control blocks will be freed up when the reply to the message from the client is sent.

Figure 10:
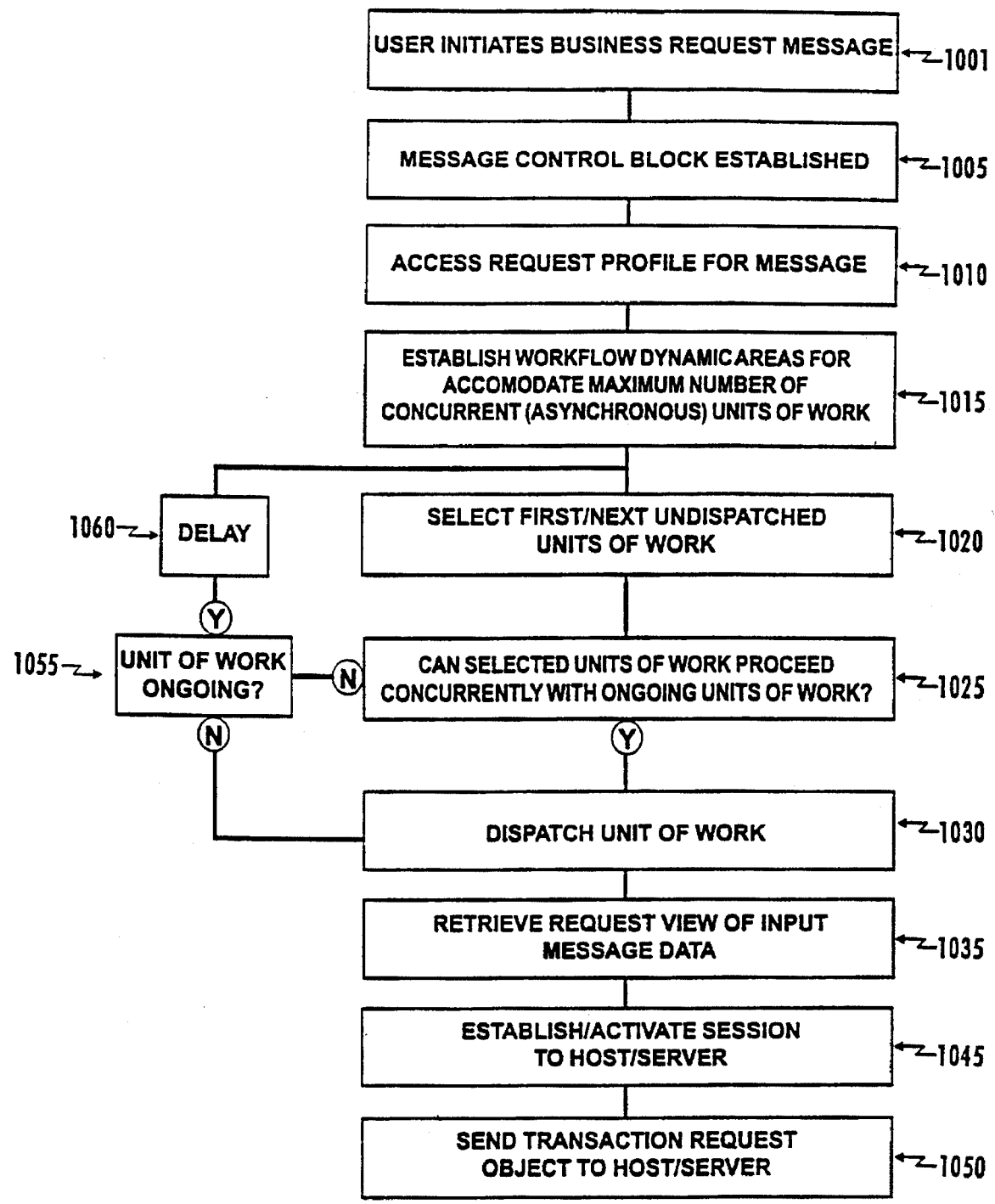
FIG. 10 is a flow chart illustrating one example in which a customer service representative initiates a request message receives information back from a back end server.

FIG. 10 is a flow chart of an example of the work flow process from the time a request message is received (1001) to the time a transaction request is dispatched to the server 1050. The reply process is depicted in a flow chart in FIG. 11.

As shown in FIG. 10, a customer service representative initiates (1001) a request message. The message is received at the MDP and a message control block is established (1005) as described above. The request profile for the type of the message received is accessed (1010) and the message control areas are updated. If an unexecuted unit of work from the profile can proceed concurrently with other units of work, the workflow manager dispatches the unit of work and processing of the work flow object begins. If it cannot, it checks to see if there is an ongoing unit of work and if there is it will delay (1060) until a unit of work completes. If there is no ongoing unit of work, the next unit of work will be dispatched (1030). Upon dispatch, the request view of the input message data is retrieved, a session to the back end host established (1045) and a transaction request sent to the host.

Figure 11:
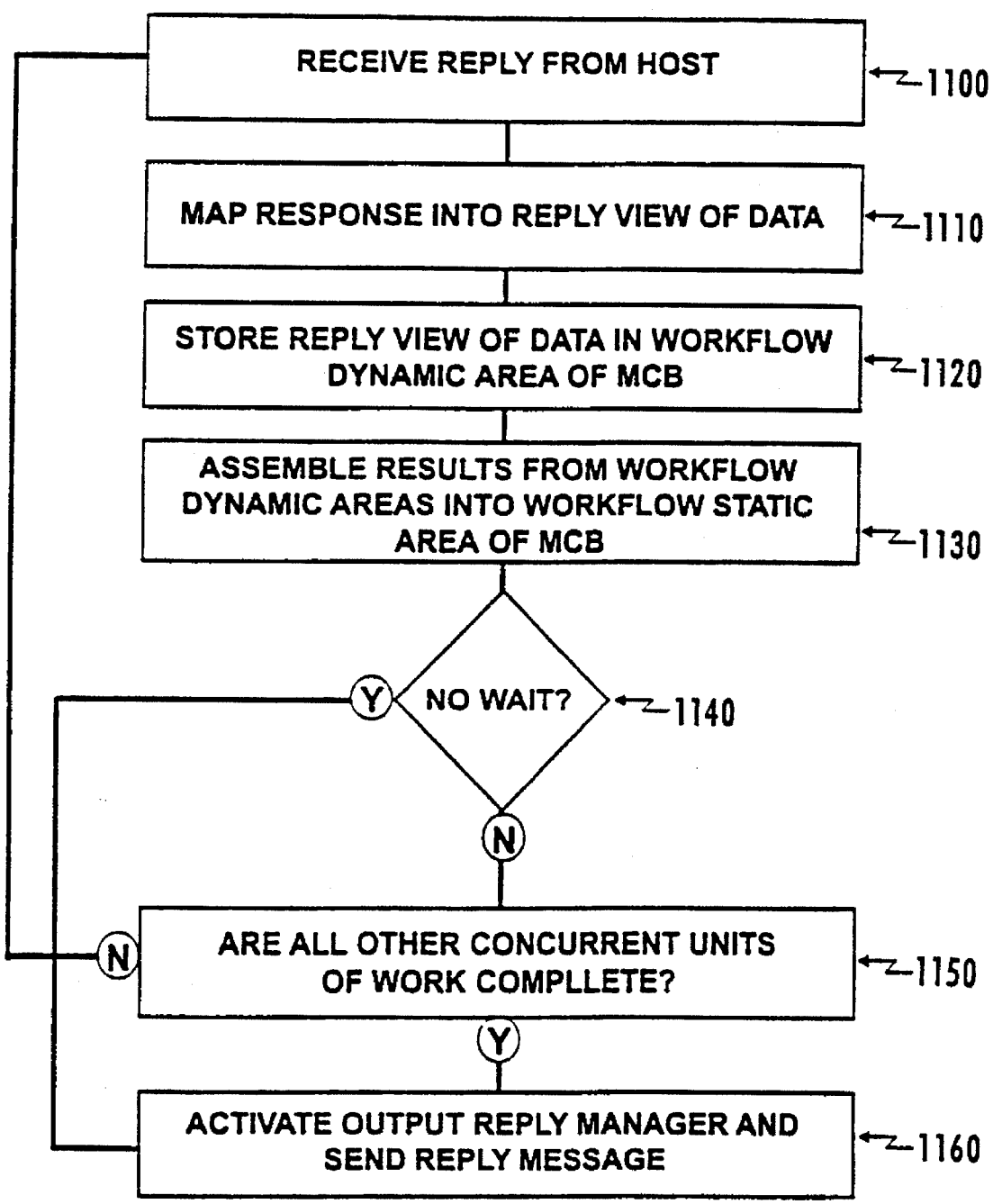
FIG. 11 illustrates an example of how the back end server replies to a request from the work flow manager and how it is processed into one or more reply messages to be sent to the customer service representative.

As shown in FIG. 11, when the reply comes back from the host 1101 the response mapped into a reply view of the data at 1110 and the reply is stored (1120) in the workflow dynamic area of the message control block. The results are assembled from the workflow dynamic areas to a Reply Message Data area 914 in the workflow static area of the message control block (1125). If all necessary responses have not been received and no-wait is not active, nothing happens (1150) but if all responses have been received (1150), the output reply manager is invoked and one or more reply messages are sent (1160) to the customer service representative. In a no-wait mode, multiple reply messages are generated from work flow dynamic blocks as responses are received.

There are several types of request messages. One is the session control message. Another is the business request. A third is a system request. In the run time environment, when clients actually execute work flows to perform business functions, an MDP session must first be established for the client in the MDP before the process of sending requests and receiving replies can take place. To establish and end a session, a session control message must be sent from the client to the MDP.

A session control message will not necessarily have a work flow associated with it. All it may be is a simple message sent to the MDP requesting a session be started and a session control block be established. When ending a session, all the message may require is the deletion of the session control block and little else. However, the option of associating specific tasks with a session control message opens the door for the client to possibly perform automatic logons to back end systems, as well as any other standard start up tasks. Completion of these tasks can be indicated to the client in the form of one or more reply messages.

The work flow object builder is a flexible code-generator that creates work flow objects suited to perform specific elementary tasks. These objects, when strung together in routing sequence or profile, collectively form a work flow. A workflow, designed to fulfill tasks associated with a request, or unit of work, is triggered by a request profile and executed by the work flow manager. For example, some work flow objects may access back end systems via NV/AS™ (Net View/Access Services), FEPI™ (front end programming interface to CICS), MQI (MQ™ Series interface) and others mechanism or protocols). Some units of work may run substantially concurrently (sometimes called asynchronously) as permitted by an object profile. Some work flow objects may be designed specifically for data manipulation or for checking data obtained by other work flow objects.

The final work flow object in a work flow or unit of work will typically construct one or more reply messages to be sent back to the front end client.

There are several types of work flow objects namely message handlers, dispatchers, responders, NVAS work flow objects and FEPI work flow objects. A work flow object that accesses information contained in one or more of the items in temporary storage from the session control block and uses it to make routing decision or to format output message views that may be required to obtain information from other systems is called a message handler. Message handlers are not typically designed for reusability by multiple work flows since much of their purpose is specific to a certain request. The decomposition of a request message and recomposition of one or more reply messages will most likely be found in this type of work flow object. Message handlers will also be used to perform miscellaneous processing functions such as VSAM file I/O, interface to a database, etc.

A dispatcher is a work flow object defined for use as part of a pair of objects. Used with the responder, dispatchers initiate transactions using an MQ series™, a CICS peer-to-peer, an LU6.2 or other mechanisms or protocols. Dispatchers are typically used when it is necessary to execute a task that is external to MDP. A dispatcher is primarily responsible for setting parameters associated with the external task, such as PUT queue name, responder name, etc. The dispatcher/responder pair is inherently a sequential (sometimes called synchronous) process. Once something is dispatched the work flow unit of work waits for a response. However, dispatcher/responder pairs may be part of a concurrent (asynchronous) object profile.

Responders get involved after the external target task is completed and the MDP resolution processes have been invoked. A responder receives information from the target task in the session control block item area defined at dispatcher development time.

NV/AS, FEPI and other work flow objects which can accommodate a variety of different platforms perform 3270 emulation to retrieve data and map from back end applications into the session control block.

Figure 12:
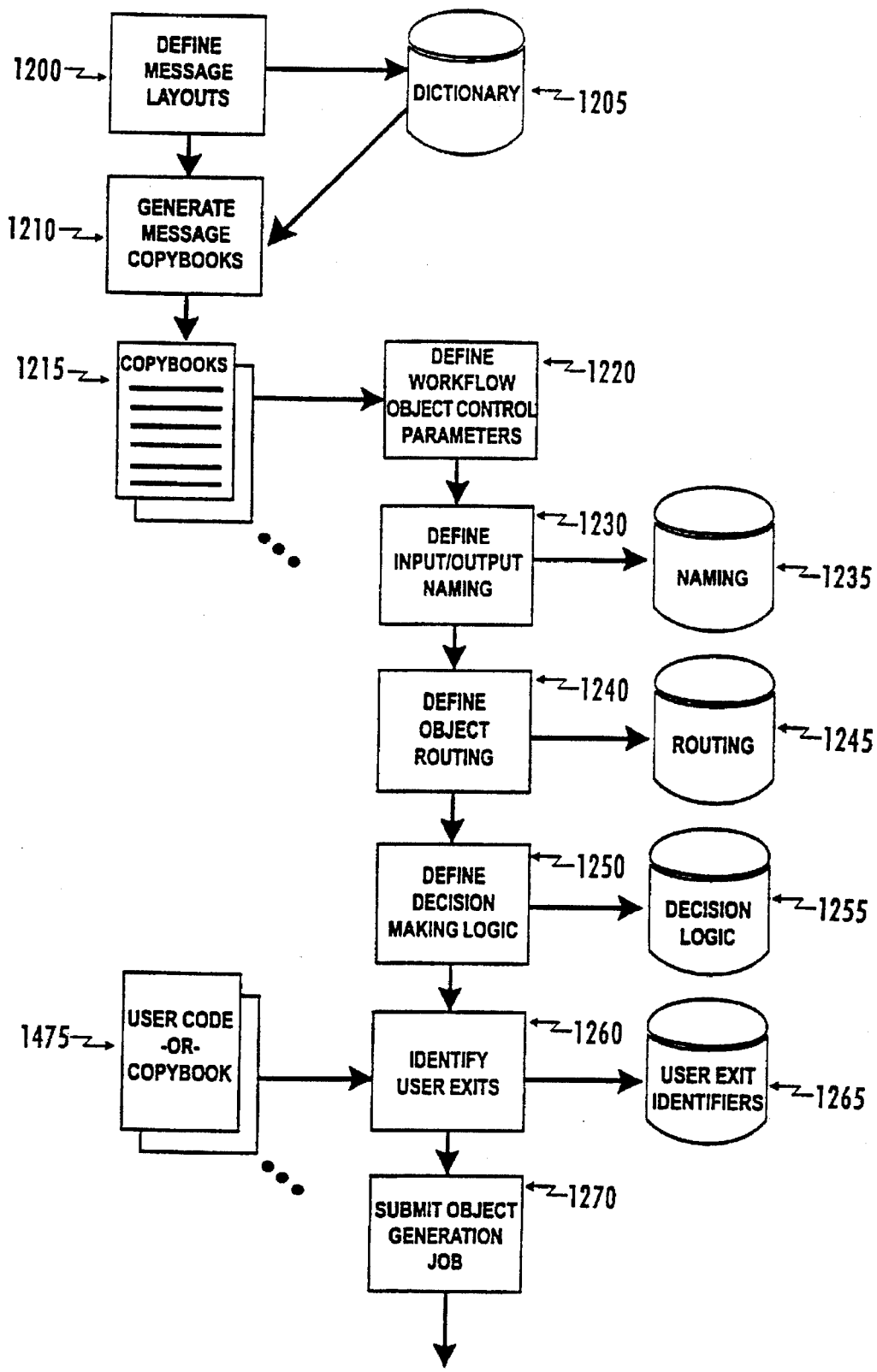
FIG. 12 is a flow chart of the work flow object builder.

In the process of building a work flow object, the developer specifies the type of work flow object to generate and then is guided through a building process. The building process is set forth in FIG. 12. The start of the development process involves a definition of message layouts (1200). Here, specific field definitions for incoming and outgoing messages are defined and stored in a data dictionary 1405. Certain views of message data are generated in the form of copy books or structures (1210) and are available for use during the definition, design and development of the object. Certain implementation specific workflow object parameters are optionally defined at 1220. At 1230, data elements used as input and output within the module are defined, optional edits applied and named object data elements information stored at 1235. Object routing optionally defined at 1240 specifies, inter alia, the order in which workflow objects are executed, and the routing information is stored at 1245. The developer defines certain decision making logic at 1250 which is stored at 1255. Certain user exits are identified at 1260 through which calls to user developed sub-routines (1275) and standard library (copybook) functions can be incorporated selectively. User exits are named and their identifiers stored at 1265. Once a developer has been guided through this process, sufficient information has been stored to submit the object specified in the process of FIG. 12 for code generation.

Figure 13:
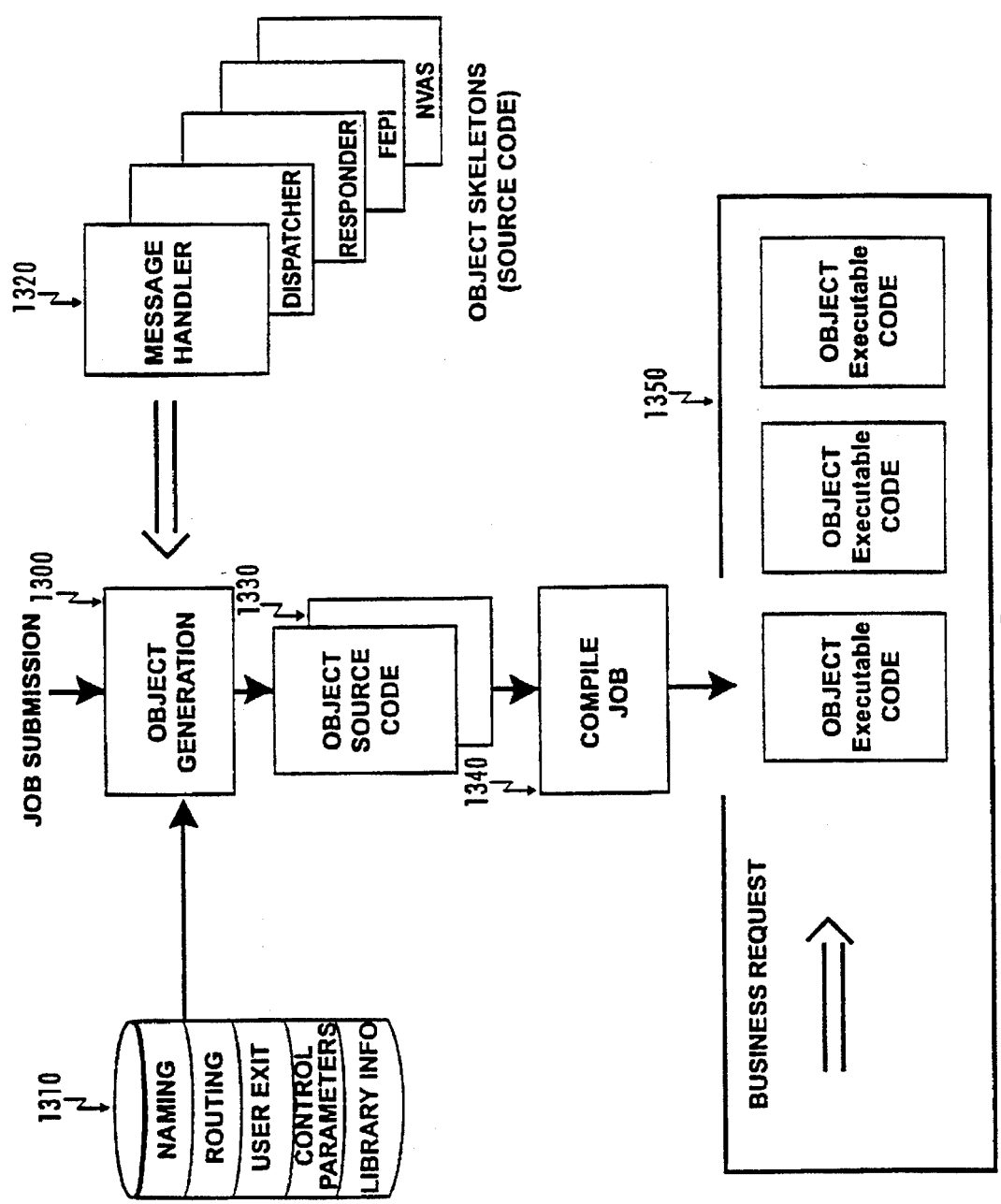
FIG. 13 shows compilation of a work flow object into executable code.

FIG. 13 illustrates the code generation process. The work flow object generation process 1300 incorporates all of the development information stored from a user during the development process and integrates it with work flow object skeletons 1320.

Each type of work flow object has a predefined source code skeleton consistent with its particular function which is used as the infrastructure for creation of object source code 1330. The object skeletons 1320 are fleshed out in object generation block 1300 by incorporating the information captured at 1310 and stored into the final source code. Once all of the user defined information has been integrated into the skeleton, a complete source code block exists at 1330 and can be optionally submitted for compilation (1340). Once compiled into executable code, the object may be utilized as part of a work flow needed to satisfy a request (1350).

Figure 14:
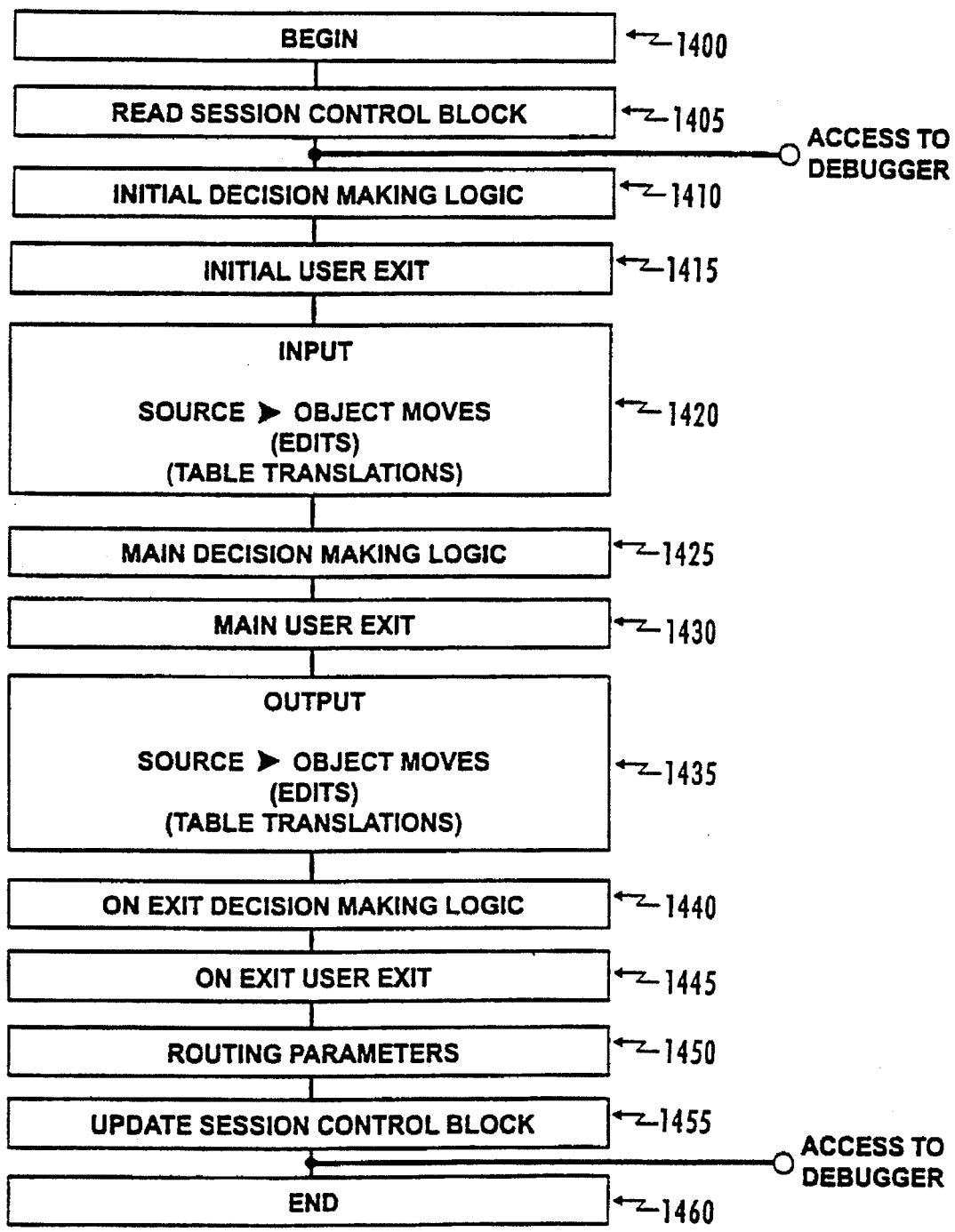
FIG. 14 is a flow chart of a skeleton of one type of workflow object (a message handler)
Figure 15:
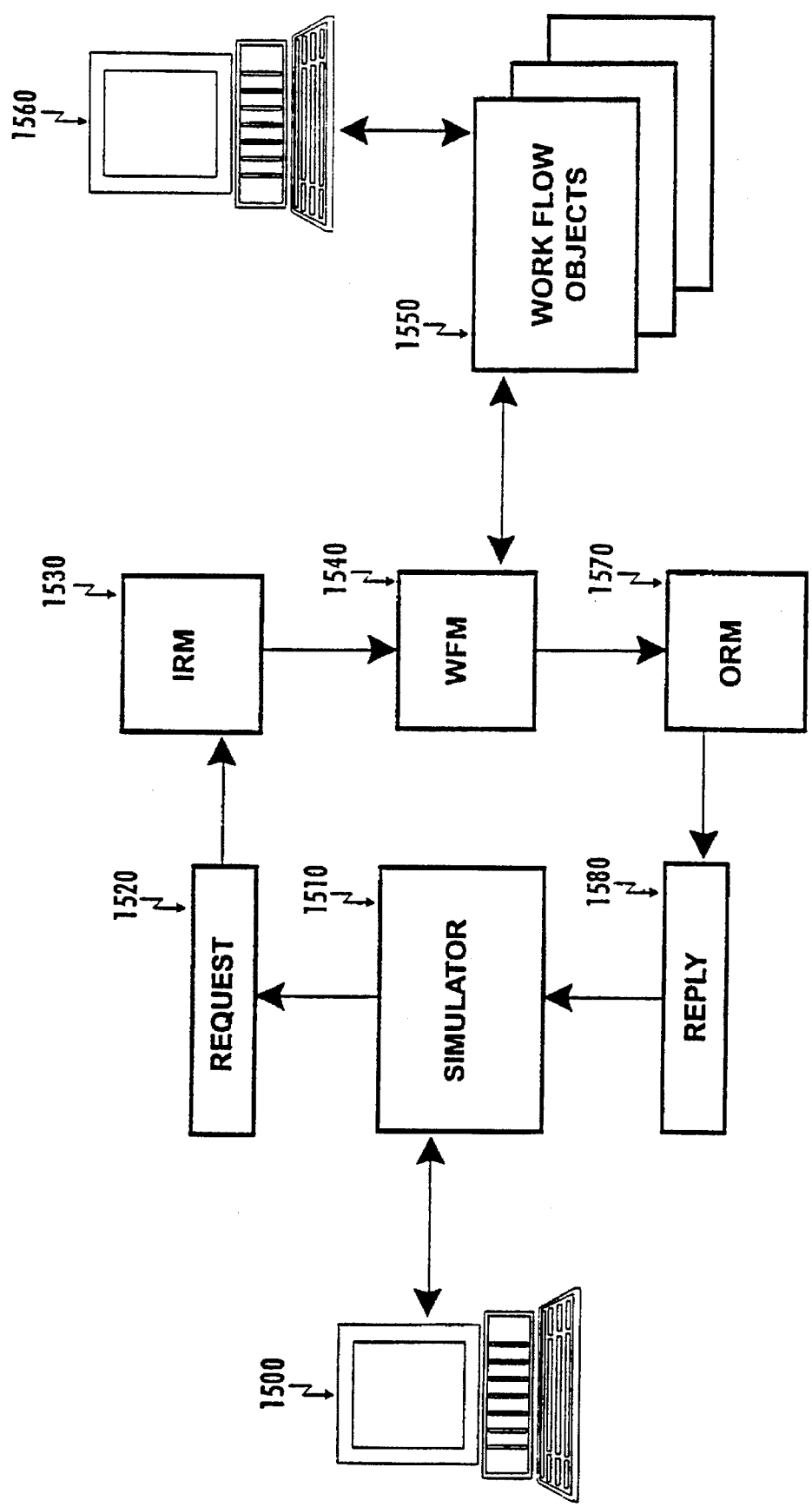
FIG. 15 shows diagnostic processing with simulation.

FIG. 14 is a high level flow chart of a skeleton of a message handler 1320 from FIG. 13. The skeleton begins (1400) with reading the session control block 1405. Selective access to the debugger is provided between blocks 1405 and 1410 to permit the state of the input information from the SCB to be captured for evaluation. Initial decision making logic 1410 processes logic defined during the development process. Input block 1420 performs data validation and checking, edits and table translations that otherwise prepare the data for the main processing functions 1425. The main decision making logic is predefined for each type of work flow object and its source coding included in block 1425. Main user exit 1430 permits the incorporation of source code modules previously developed and stored in library for the inclusion of user developed routines into the overall source code stream. Output block 1435 is analogous to input block 1420 and prepares data for output from the work flow object. The next decision making logic 1440 is predefined for the object and user exit 1445 permits the user one additional opportunity to customize the module by incorporation of library or custom subroutines. Routing for the output data is optionally defined at 1450 and ultimately, the session control block is updated with the final versions of data processed by the work flow object (1455). Selective access to debugger is provided after block 1455 to permit the changes to the SCB caused by object execution to be captured for evaluation. The source code ends at 1460.

Internal routing from one work flow object to another can be defined during the work flow building process to be either static or dynamic. Dynamic routing can be based on data content and/or context within the session control block.

All the work flow object characteristics and parameters are stored in the work flow object definition and decision making files. These files are referenced during the batch work flow object generation process in which the parameters are converted into CICS command level source code, then compiled and linked into an executable module.

Debugger/simulator modules shown in of FIG. 6 are available typically in the development environment to provide testing support for work flow objects.

Bypassing part of the protocol layer, the Debugger/simulator modules allow simulation and diagnostics of workflows to allow the developer to examine the session control block through all of the major processing steps in all of the workflow's objects. It also allows performance analysis and automated testing. If the workflow acquires data from back end hosts and applications, this data is incorporated in the workflow's processing as well. These two special development features help developers test workflows before subjecting them to the condition of network level testing with custom front end applications.

The simulator formats and submits certain session control messages in order to simulate a client who is requesting services. The simulator allows for the input of user data in all request messages. The data can be typed in free form or can be formatted via a data dictionary.

The simulator also allows the active message buffer to be written to the input request file. This file is used as the simulator's depository for request messages. With the potential for large or numerous messages, this file can be used to store data and eliminate the need for time consuming data re-entry.

The simulator can replay any message stored on the input request file by loading the record into the active message buffer. The data can then be modified prior to being sent in a request message. All input request messages can be updated on the file or deleted from the file. The data can also be used as a template to create additional request message data formats.

In the case of an error, the simulator can display available information about the source of the error. The simulator can also display the header of the reply message that MDP generates in response to the simulator client's message as well as providing view capabilities of the session control block.

In addition, the simulator has been integrated with the workflow debugger to allow for simulation and diagnostics from a single terminal. This allows the simulator to turn debugging on and off on the processing of each message. The workflow debugger has the ability to capture data from the request item area of the session control block and store the data in the input request file. The simulator also provides the ability to terminate processing by performing the appropriate signoff request messages or by archiving the current session on the host.

The simulator may be used as an aid in network level testing with custom front end applications. The simulator can send a message that is identical to a target message sent from a front end application on a client or a client work station. The journal display can be used to confirm that the two messages are identical. If the simulator has already tested the workflow that is associated with the target message, and if journal display confirms that the simulation message and the target message are identical, then it is likely that the problem lies with the custom front end application.

The system provides run time diagnostics through the use of the workflow debugger, providing the ability to interactively debug the workflows that support the processing of Request Messages. This is accomplished by executing the workflow in a terminal-associated fashion, thereby allowing screen display and interactive user intervention at the host level.

When the workflow debugger is activated, pre-selected workflow objects will become terminal-associated at various exit points and will provide the following features:

Display of the session control block.

Symbolic mapping at the field level for each session control block item.

Field level data manipulation.

Save Request data to the Input Request file for use with the Simulator.

Debug processing control (i.e., abort Request Message, terminate debugging, etc.).

The workflow debugger allows all items of the session control block to be symbolically viewed. An initial screen will be displayed showing all items and the symbolic chapter that will be used to map the item. The process of starting the workflow debugger is generated at two exit points in every workflow object. The first exit point is before the main logic is performed, immediately after the session control block has been read into the program. The second exit point is at program completion, after any session control block updates have been processed. In addition, there are two symbolic views available to the workflow debugger for each item: active and prior. The user can toggle between these views.

Through the use of symbolics, session control block data can be displayed and manipulated at the field level. From the initial workflow debugger screen, a session control block item area can be selected and displayed via the Symbolic Mapping Utility. A list processor of symbolic fields used to map the selected item area displays, allowing the user to list and search for fields by name or offset. Left/right scrolling capabilities are available to view the field data. Field data values may be displayed in Character or Hex Mode.

Field data values can be updated by entering an Update Mode. The user can toggle between Update Mode and Browse Mode. When in Update Mode, field data values are modifiable. Field updates are applied to the session control block.

Fields can also be optimally initialized. Alphanumeric fields are initialized to spaces and numeric fields are initialized to zero.

If the user wishes to save the request area data stored in the session control block for future testing, the workflow debugger provides that capability. This data can then be saved and reused when testing with the Simulator (i.e., without having to reenter data repeatedly).

The user may terminate debugging at will, continue while viewing the SCB at every exit point, suspend and reactivate debugging and re-execute a workflow object.

Figure 16:
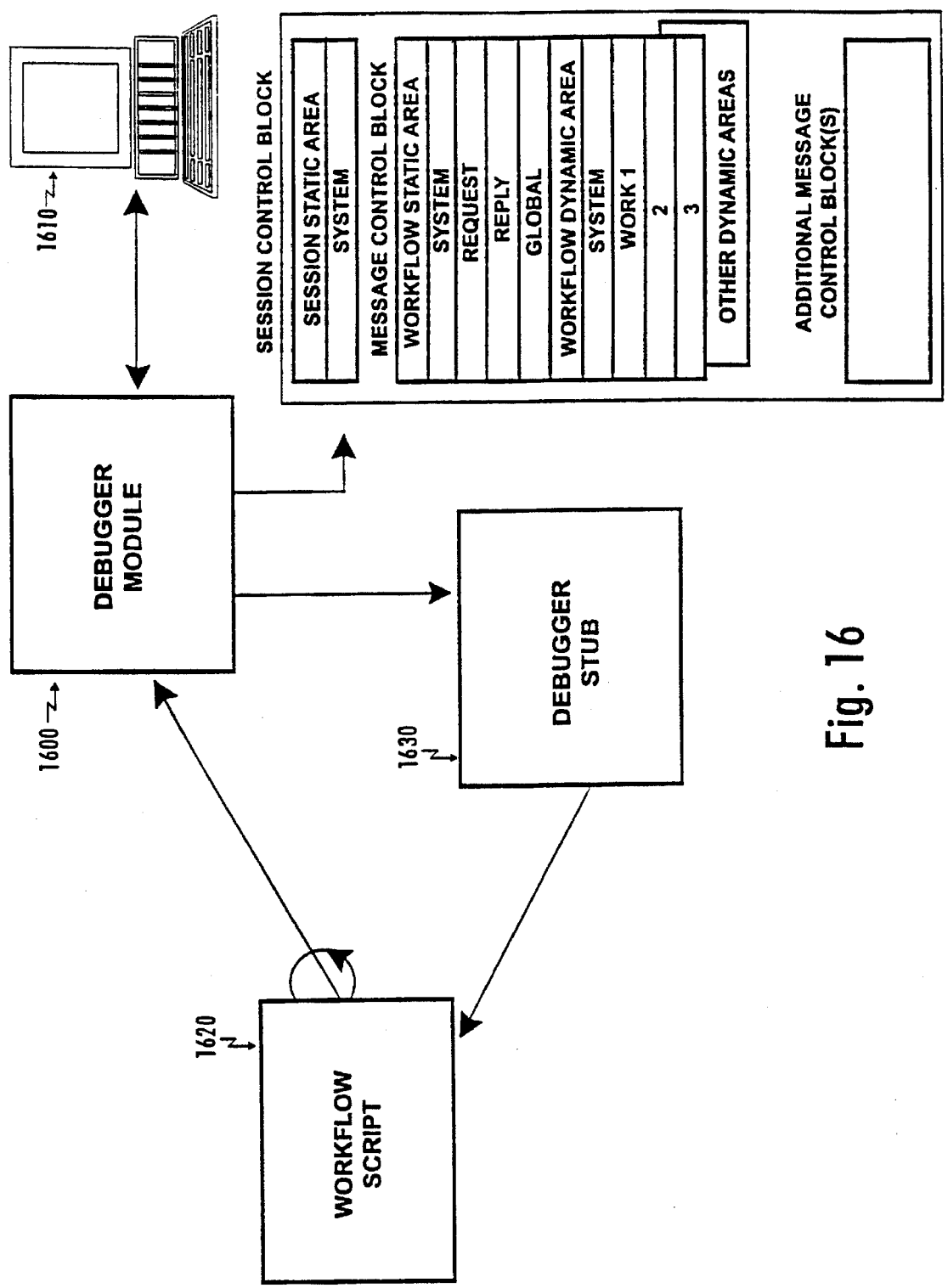
FIG. 16 shows diagnostic processing using debugging.

As shown in FIG. 16, the work flow debugger provides on line addressability to items within the session control block and permits data field examination and modification. If necessary, the work flow debugger may be turned on in the run time environment for setting traps and handling exceptional data conditions for real time or later analysis. In operation, debugging is started from terminal 1610.

As a request is being processed, workflow objects are initiated. If a workflow object is enabled with debug support, it will initiate debugger module 1600 at the awaiting terminal at defined entry points (see FIG. 14) within the workflow objects. The debugger module allows interactive data display and manipulation. Once the session control block analysis is completed, the debugger stub 1630 is started by the debugger module. The debugger stub activates the workflow 1620, to resume execution, until the next debug entry point is encountered or workflow processing is complete.

In the process of creating certain work flow objects such as FEPI work flow objects and NVAS work flow objects, it is often the case that the backend host expects a set of screens of data to be presented to it in a particular order. It is possible to manually design such screens using, for example, COBOL. However, when interacting with a terminal (3270 or otherwise) the host transmits a set of data and commands which identify the locations of variables on the screen. The terminal uses these data and commands to paint the screen and to extract data for sending to the host when data entry is complete. The system of the invention captures the screen information sent from the host and uses captured screens to emulate a screen based interaction of a terminal and the host by stuffing captured screens information with the proper data and presenting those screens to the host in the order the host expects.

Server agents are analogous to client agents. These provide the protocol interface drivers, state management and error recovery to create and maintain logical sessions to the back end systems.

Figure 17:
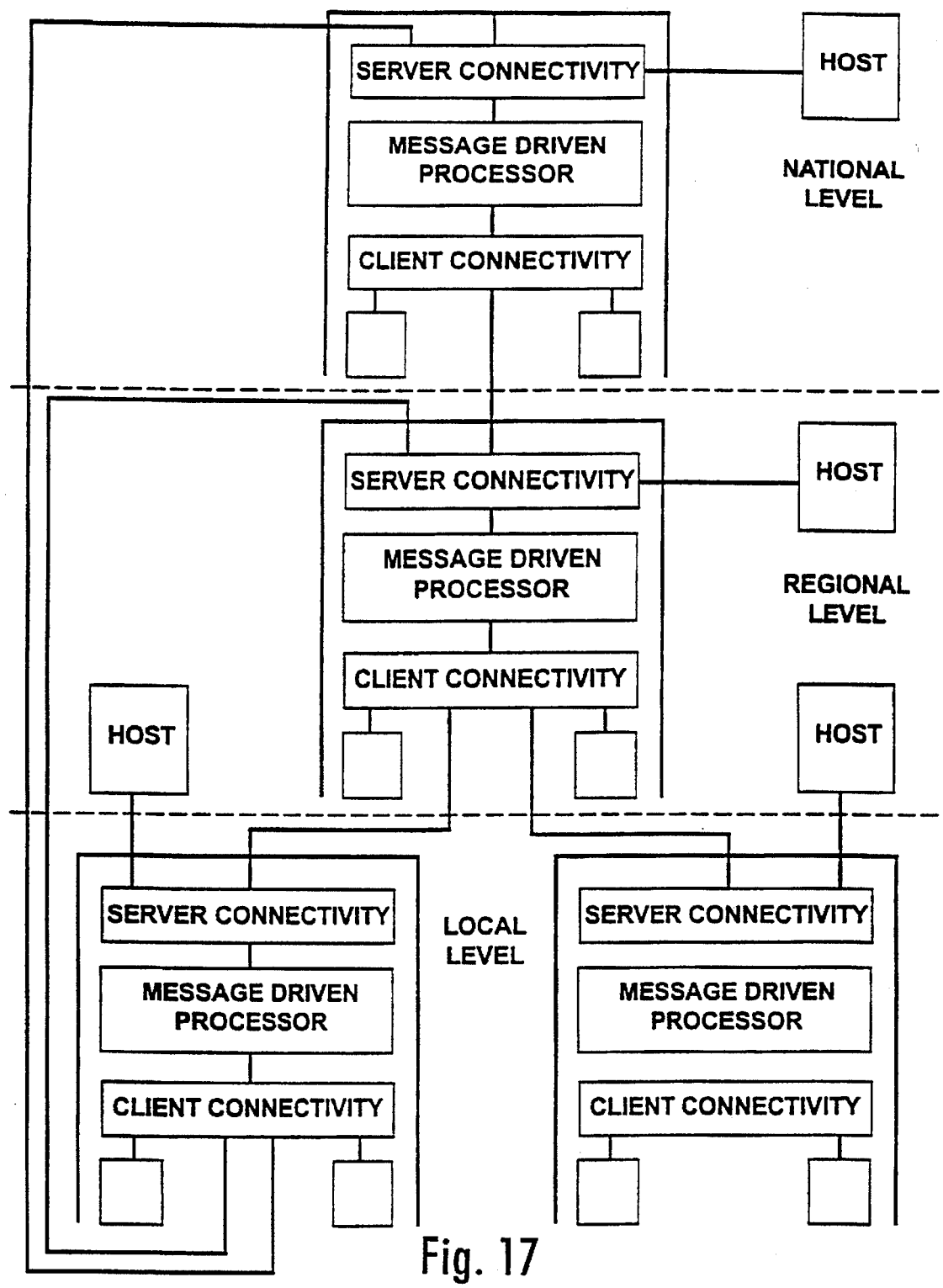
FIG. 17 is an illustration of how MDP processors can be utilized in an hierarchal arrangement.

FIG. 17 illustrates how hierarchal arrangements of MDP systems can be utilized. As shown in FIG. 17 the output to the back end servers from one layer of MDP processors is utilized as the client input to the next level of MDP processors. Thus, the work flow objects executed at the lowest level may constitute a client message for the MDP server at the next higher level. Thus, entire hierarchies of MDP processors can be utilized. This is particularly convenient when one MDP processor is utilized as an office server and a number of offices are serviced by a region and the next level in the hierarchy constitutes a regional processor which provides information to the local offices served by it. This allows local offices to develop their individualized business practices while still being able to access the regional offices ADP resources. There can be, of course, plural regional offices and each local office can access one or all of the regional offices and one or more national offices. Regional or national office can access one or all of the others as desired or required.

In this disclosure, there is shown and described only the preferred embodiment of the invention, but, as aforementioned, it is to be understood that the invention is capable of use in various other combinations and environments. It is capable of changes or modifications within the scope of the inventive concept as expressed herein.

What is claimed is:

1. A message driven client-server system comprising:
   a. a plurality of sets of one or more client processes running on respective client processors, selectively generating request messages;
   b. one or more server processes running on one or more host processors providing reply information;
   c. a message driven processor for translating a request message from a client process into one or more units of work required to satisfy the request and for selectively sending a transaction request message to one or more server processes;
   d. means for providing message based connectivity between one or more client processes and said message driven processor;
   e. means for providing connectivity between the message driven processor and one or more server processes; and,
   f. means for assembling reply information from a server process into one or more reply messages and sending the reply message to the client process which originated the request message;
   whereby a message from a client processor is translated into units of work and transactions are selectively sent to the host processors and information retrieved is returned to the client in satisfaction of the request message.

2. A message driven client-server system in accordance with claim 1 in which:
   the means for providing message based connectivity between a client process and said message driven processor comprises a plurality of client agents which handle different communications protocols which may be used by the client processors.

3. A message driven client-server system in accordance with claim 1 in which:
   the means for providing connectivity between the message driven processor and the server processes comprise a plurality of server agents which handle respective requests of a type usable by the server process being accessed by a transaction.

4. A message driven client-server system in accordance with claim 1 in which:
   the message driven processor for translating a request message from a client process into one or more units of work required to satisfy the request comprises a request profile for each type of message which a client can send which associates the request message with said units of work.

5. A message driven client-server system in accordance with claim 1 in which:
   the message driven processor further comprises a session control block.

6. A message driven client-server system in accordance with claim 5 in which the data contained within the session control block is defined in a data dictionary.

7. A message driven client-server system in accordance with claim 5 in which the session control block comprises a session static area of memory and one or more message control blocks.

8. A message driven client-server system in accordance with claim 7 in which the session control block comprises one or more message control blocks having a workflow static area including a request area where information from the client related to a request is stored, a reply area where information to be sent to the client in response to the request is stored and a global work area.

9. A message driven client-server system in accordance with claim 3 in which a session control block comprises a request area from which a request view of data is obtained for use in constructing work flow requests to be sent to a server as part of a transaction.

10. A message driven client-server system in accordance with claim 3 in which a session control block comprises a reply area to which a reply view of data obtained from a one or more servers is sent to be packaged into one or more reply messages to be sent to the client which submitted the request message.

11. A message driven client-server system in accordance with claim 1 in which messages from a client are directed to a store and forward client which comprises:
   a. means for receiving a request from a client,
   b. means for setting processing of the request for a scheduled time, and
   c. means for forwarding the request from the client to the message driven processor for execution when the scheduled time arrives.

12. A method of accessing information from a server in response to a message containing a request from a client process comprising:
   a. retrieving a request profile associated with said message containing a list of units of work necessary to complete the request contained within the message;
   b. sending transaction requests from the message driven processor which require server action to satisfy the request of the request message to one or more host processors;
   c. receiving one or more server responses;
   d. formatting information received from said one or more servers into one or more reply messages to be sent to the client process which sent said message containing a request.

13. A method of reducing the number of communications sessions required in a client server system in which a plurality of client processes running on one or more client processors retrieves information from one or more host processors comprising:
   a. sending a request message from a client process to a message driven processor without establishing an ongoing communication session;
   b. sending transaction requests from the message driven processor which require server action to satisfy the request of the request message to one or more host processors; and
   c. receiving information back from said one or more host processors and assembling the information into one or more reply messages to be sent to the requesting client process;
   whereby communication sessions are not required between client processors and each host.

14. A method of communicating information between one or more client processes running on respective client processors and one or more server processes running on one or more host processors by way of message driven processor which translates a request message from a client process into one or more transactions at least one or more of which are sent to a server process, comprising:
   a. sending a request message from the client process to the message driven processor, the request message containing a Common Message Header identifying source and destination of the message, a Message Specific Context Header identifying a particular type of request and a Message Data Context Area containing data related to the request; and
   b. receiving from the message driven processor one or more reply messages containing information requested.

15. Apparatus for communicating information between one or more client processes running on respective client processors and one or more server processes running on one or more host processors by way of a message driven processor which translates a request message from a client process into plural transactions at least two of which are sent to a server process, comprising:
   a. means at the message driven processor for dispatching transactions which do not depend on the results of each other concurrently to the one or more host processors; and
   b. means for assembling replies received from said one or more host processors into one or more reply messages to be sent to a client process which sent said request message.

16. A method for communicating information between one or more client processes running on respective client processors and one or more server processes running on one or more host processors, comprising:
   a. sending a request message from a client process to an intermediate process;
   b. establishing a session control block at the intermediate process comprising a session static area and one or more message control blocks containing a request data area and a reply data area;
   c. accessing a message profile characteristic of the particular message sent to the intermediate process to identify units of work required to satisfy the request of said message;
   d. establishing one or more workflow dynamic areas as part of the session control block for transactions;
   e. selecting transactions for dispatch to one or more server processes;
   f. dispatching, concurrently, those units of work which do not depend upon completion of earlier dispatched units of work by retrieving a request view of data contained in the session control block and formatting that data into a workflow request;
   g. establishing or accessing a previously established communications session to a host running the server process required to satisfy the transaction and sending a transaction request to the host;
   h. receiving a response from a replying host;
   i. mapping data received from a replying host into a reply view of data;
   j. storing the reply view of data in the session control block; and,
   k. assembling one or more reply messages from data stored in the session control block and sending the reply messages to the requesting client process.

17. A message driven client-server system comprising:
   a. a plurality of sets of one or more client processes running on respective client processors;
   b. one or more server processes running on at least two host processors;
   c. first level message driven processor for translating a request message from a client process into one or more first level transaction messages required to satisfy the request;
   d. one or more second level message driven processors for translating a request message from a client or a transaction message from a first level message driven processor into one or more second level transactions required to satisfy the request;
   e. means for providing message based connectivity between a client process and said first level message driven processor;
   f. means for providing connectivity between the first and second level message driven processors and the server processes; and
   g. means for assembling reply information from a server process into one or more reply messages and sending the reply message to the client process which sent the request message;
   whereby a request message from a client processor is translated into one or more transactions and those transactions are selectively sent to one or more host processors in a hierarchy of host processors and information retrieved in response is returned to the client in satisfaction of the request message.

18. A method for processing messages from a client comprising:
   a. selectively generating request messages from a plurality of sets of one or more client processes running on respective client processors;
   b. sending one or more request messages from one or more client processes to an intermediate processor;
   c. at an intermediate processor, translating a request message from a client process into one or more units of work required to satisfy the request and for selectively sending at least one request message to one or more server processes running on one or more host processors;
   d. providing reply information from said one or more server processes to the intermediate processor;

e. assembling reply information from a server process into one or more reply messages and sending the reply message to the client process which originated the request message;

whereby a message from a client processor is translated into transactions and the transactions are selectively sent to host processors and information retrieved is returned to the client in satisfaction of the request message.

19. The method of claim 17 further comprising:

a. receiving a request from a client, b. setting execution of the request for a scheduled time, and c. when the scheduled time arrives, forwarding the request from the client to the intermediate processor for processing.

* * * * *